US010524265B2

(12) United States Patent
Zhou et al.

(10) Patent No.: US 10,524,265 B2
(45) Date of Patent: Dec. 31, 2019

(54) METHOD AND BASE STATION FOR MANAGING RADIO RESOURCES OF DEVICE-TO-DEVICE COMMUNICATION

(71) Applicant: Huawei Technologies Duesseldorf GmbH, Duesseldorf (DE)

(72) Inventors: Chan Zhou, Munich (DE); Oemer Bulakci, Munich (DE); Josef Eichinger, Munich (DE); Raja Sattiraju, Kaiserslautern (DE); Andreas Andrae, Kaiserslautern (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 15/446,850

(22) Filed: Mar. 1, 2017

(65) Prior Publication Data
US 2017/0181154 A1 Jun. 22, 2017

Related U.S. Application Data

(63) Continuation of application No. PCT/EP2014/068522, filed on Sep. 1, 2014.

(51) Int. Cl.
*H04W 72/04* (2009.01)
*H04W 4/70* (2018.01)
(Continued)

(52) U.S. Cl.
CPC ........... *H04W 72/048* (2013.01); *H04W 4/70* (2018.02); *H04W 8/005* (2013.01); *H04W 88/02* (2013.01)

(58) Field of Classification Search
CPC ..... H04W 72/048; H04W 4/70; H04W 8/005; H04W 88/02
See application file for complete search history.

(56) References Cited

U.S. PATENT DOCUMENTS 9,301,306 B2 * 3/2016 Roy ................... H04W 72/048
2014/0003319 A1 * 1/2014 Etemad ................ H04W 28/08
370/312
(Continued)

FOREIGN PATENT DOCUMENTS

CN 103929755 A 7/2014
WO WO 2012019349 A1 2/2012
(Continued)

OTHER PUBLICATIONS

Bao et al., "Novel Frequency Reusing Scheme for Interference Mitigation in D2D Uplink Underlaying Networks," 2013 9th International Wireless Communications and Mobile Computing Conference (IWCMC), Sardinia, Italy, Institute of Electrical and Electronics Engineers, New York, New York (Jul. 1-5, 2013).

(Continued)

*Primary Examiner* — Andrew Lai
*Assistant Examiner* — Harry H Kim
(74) *Attorney, Agent, or Firm* — Leydig, Voit & Mayer, Ltd.

(57) ABSTRACT

The present invention relates to a radio resource management method 100 for Device-to-Device (D2D) communication in a wireless network, and to a base station 200 for performing this method 100. The method 100 initially determines 101 angle information with respect to a base station 200 for at least one Cellular User Equipment, C-UE 302, and/or at least one D2D User Equipment, D-UE 302, within at least one cell 300 of the wireless network.

11 Claims, 17 Drawing Sheets

(51) Int. Cl.
*H04W 8/00* (2009.01)
*H04W 88/02* (2009.01)

(56) References Cited

U.S. PATENT DOCUMENTS

| | | | | |
|---|---|---|---|---|
| 2015/0304911 A1* | 10/2015 | Wang | ................... | H04W 36/32 |
| | | | | 370/331 |
| 2015/0351089 A1* | 12/2015 | Li | ...................... | H04W 72/082 |
| | | | | 455/426.1 |
| 2015/0373730 A1* | 12/2015 | Fujishiro | ............... | H04L 1/0003 |
| | | | | 455/450 |
| 2015/0373766 A1* | 12/2015 | Morita | .................. | H04W 76/14 |
| | | | | 370/330 |
| 2017/0332427 A1* | 11/2017 | Yamazaki | ............. | H04W 76/14 |
| 2018/0034603 A1* | 2/2018 | Xiao | ................... | H04W 52/243 |

FOREIGN PATENT DOCUMENTS

| | | | |
|---|---|---|---|
| WO | WO 2013165291 | A1 | 11/2013 |
| WO | 2014022769 | A1 | 2/2014 |

OTHER PUBLICATIONS

Belleschi et al., "Performance Analysis of a Distributed Resource Allocation Scheme for D2D Communications," 2011 IEEE GLOBECOM Workshops (GC Wkshps), pp. 358-362 , Houston, Texas, Institute of Electrical and Electronic Engineers, New York, New York (Dec. 5-9, 2011).

Duong et al., "Distance-Based Interference Coordination for Device-to-Device Communications in Cellular Networks," 2013 Fifth International Conference on Ubiquitous and Future Networks (ICUFN), Da Nang, Vietnam, pp. 776-779, Institute of Electrical and Electronic Engineers, New York, New York (Jul. 2-5, 2013).

Nam et al., "Location-Based Resource Allocation for OFDMA Cognitive Radio Systems," 2010 Proceedings of the Fifth International Conference on Cognitive Radio Oriented Wireless Networks & Communications (CROWNCOM), Cannes, France, Institute of Electrical and Electronic Engineers, New York, New York (Jun. 9-11, 2010).

* cited by examiner

METHOD AND BASE STATION FOR MANAGING RADIO RESOURCES OF DEVICE-TO-DEVICE COMMUNICATION

CROSS-REFERENCE TO RELATED APPLICATIONS

This application is a continuation of International Application No. PCT/EP2014/068522, filed on Sep. 1, 2014, the disclosure of which is hereby incorporated by reference in its entirety.

TECHNICAL FIELD

The present invention relates to a radio resource management method and a base station for managing radio resources of Device-to-Device (D2D) communication in a wireless network. In particular, the present invention addresses interference mitigation and Resource Allocation (RA) in case of an underlay of D2D communications.

BACKGROUND

Direct D2D communication in addition to cellular communications in a wireless network has been proposed in the prior art. D2D technology exploits the proximity of the communicating devices to enhance cell throughput, energy efficiency and the achievable data rates. Direct D2D communication between D2D User Equipments (D-UEs) that reuse radio resources of the cellular system is seen as a key enabler for future wireless and mobile communication systems.

In order to increase the spectrum utilization, a cellular network can allow multiple D-UEs to share radio resources with Cellular User Equipment (C-UE), i.e. with User Equipments (UEs) directly communicating with an access point, such as a base station, as long as the D2D transmissions performed between D-UEs are tolerable for the cellular transmissions performed by C-UEs. This network-controlled, a.k.a. network-assisted, way of D2D communication is referred to as underlay, and has the potential to significantly increase spectrum usage, and thus the overall network performance.

Such D2D communication underlying a cellular system operation can be realized via the following four implementations, which represent operation in different modes:

1) Silent Mode: When available radio resources are not sufficient for supporting the D2D traffic, and when resource reuse is not possible, due to interference problems, the D-UES cannot transmit data, and have to stay silent. However, they can continue to operate in cellular mode.
2) Reuse Mode: D-UE devices directly transmit data by reusing radio resources of the cellular network. The resource reuse can be accomplished by using either uplink or downlink resources.
3) Dedicated Mode: The cellular network dedicates a portion of the resources for D-UE devices for their direct communications.
4) Cellular Mode: D2D traffic is relayed through network node(s) in the traditional way.

The dedicated mode and the cellular mode, respectively, simplify the task of interference management. The maximum transmission power can be used in these two modes, in order to provide the best system performance, since D2D links, i.e. communicating D-UE pairs, do not interfere with other cellular users. However, these two modes do not utilize the resources efficiently so as to maximize the overall network throughput.

In contrast, the reuse mode is better in terms of its spectral efficiency. In reuse mode the system performance can also be improved by transmission power optimization. However, explicit and complete knowledge of link characteristics, including interference levels between radio links potentially sharing the same radio resource is needed for efficient implementation of any reuse based algorithm/method. Moreover, mining of such multi-dimensional data is cumbersome and costly with respect to measurement and signaling efforts. Further, if cellular radio resources are reused for facilitating D2D communications, there is a potential risk of mutual interference between existing cellular and established D2D links, and thus overall system performance degradation.

Many state of the art approaches have focused on the co-channel interference induced by D2D operation. However, in these approaches a network node, e.g. base station, needs to know the channel state information (CSI) of all the involved links, which increases the complexity of the system.

Other state of the art approaches proposed geo-location as a substitute for radio location information, where the instantaneous link qualities between the communicating devices can be estimated based on their true geographical locations. Geo-location information can also be exploited, in order to mitigate the Cellular to D2D (C2D), D2D to Cellular (D2C), and inter D2D-to-D2D (inter-D2D) interference. However, issues such as energy efficiency, accuracy and computational overhead decide on the applicability of a particular positioning technique.

In terms of positioning technologies, network-assisted techniques such as Angle of Arrival (AoA) and Time Difference of Arrival (TDoA), are preferred over UE-based techniques, such as Assisted GPS (A-GPS) or Global Navigation Satellite System (GLONASS), since they require less signaling overhead. However, the network-based positioning techniques suffer from higher positioning inaccuracies than the UE-based techniques.

In network-controlled D2D communication, the network decides, whether communication between two UEs is allowed to take place directly (D-Mode) or via the cellular infrastructure (C-Mode), e.g. a base station. In both cases, the same radio resources are used. Hence, there is a potential risk that sub-optimum mode selection decisions may easily lead to severe interference rise and deterioration of already established cellular links. Hence, the network must also use such pre-emptive knowledge in its decision making. This decision can be based on many factors, such as the geo-location and distance between the potential D-UEs, channel and radio conditions, UE capabilities, etc.

The choice of a certain resource allocation strategy has a direct impact on overall efficiency and cell throughput. RA schemes that are able to adapt to varying user distributions and constellations, e.g. more D2D than cellular users, can greatly improve system performance.

An exemplary system of the prior art shown in FIG. 17 comprises an LTE evolved NodeB (eNB) 1700 located at a cell center, and a number of randomly placed users (C-UEs 1701 and D-UEs 1702), where users may be distributed in a uniform or non-uniform manner. D2D communication takes place in the LTE band using either TDD or FDD, where cellular resources, i.e. Physical Resource Blocks (PRBs) are reused.

Several possible interference scenarios are illustrated in FIG. 17. Due to D2D communications operating in parallel to cellular communications and reusing cellular radio resources, several new and complex interference issues arise, such as C2D, D2C, and inter-D2D interference. Thereby, a link corresponds to a communication link, over which desired information, data and/or control information, is sent bidirectional or unidirectional between the involved entities. Interference is the undesired signal, which can reduce signal-to-interference-plus-noise ratio (SINR) of the desired signal, and thus can cause performance degradation, e.g., in terms of throughput. Accordingly, the term D2D link refers to a D2D communication link, via which the desired signal is transmitted and/or received between a D-UE pair. The term cellular link refers to a cellular communication, via which the desired signal is transmitted and/or received between a C-UE and a base station, e.g. an eNB as shown in FIG. 17. The term C2D interference refers to the disturbance of a D2D communication caused by the undesired signal of a cellular communication. The term D2C interference refers to the disturbance of a cellular communication caused by the undesired signal of a D2D communication, e.g. shown as "interference to cellular eNB" in FIG. 17. The term inter-D2D interference refers to the disturbance of a D2D communication caused by the undesired signal of another D-UE pair.

Therefore, resource management for D2D communication underlying a cellular infrastructure is particularly challenging, since intra-cell and inter-cell interference need to be managed between the cellular and D2D links.

Belleschi et al. "*Performance analysis of a distributed resource allocation scheme for D2D communications*", IEEE GLOBECOM Workshops, 2011, presents a framework for joint optimization of mode selection, resource assignment and power allocation. However, optimum performance can only be achieved, if full knowledge on C2D, D2C, and inter-D2D channel gains is available.

Nam et al. "*Location-based resource allocation for OFDMA cognitive radio systems*", Proceedings of the Fifth International IEEE Conference on Cognitive Radio Oriented Wireless Networks & Communications (CROWNCOM), 2010, introduces a RA algorithm for OFDMA-based cognitive radio systems, which utilized location information of primary and secondary users instead of the CSI of the interference link. However, accurate positioning technique (therein, GPS) is assumed, in order to remove the CSI dependency for RA. Moreover, the interference is estimated in the probabilistic sense (log-normal shadowing) by considering the distance between the transmitting UE (Tx UE) and receiving UE (Rx UE), thereby also requiring precise channel models.

Further, distance dependent RA schemes are known from the prior art. For example, in one scheme the network assigns a certain D2D link the PRB of a C-UE, which is at a distance $L > L_{min}$, wherein $L_{min}$ is a pre-selected distance constraint, in order to control the interference from the selected C-UE to the D-UE using the same PRB. If the D2D transmission is envisioned to be in cellular Uplink (UL), the D2C interference is not effectively eliminated in this case, since the distance between the base station (BS) and the transmitting D-UE is not considered for the RA. However, the C2D interference can be mitigated by optimal selection of the distance $L_{min}$. One major disadvantage of distance-based RA schemes is that for optimum RA decisions, accurate geo-positioning is required, which results in increased signaling overhead and processing delays.

SUMMARY

In view of the above-mentioned disadvantages and problems, the present invention aims to improve the state of the art. In particular, it is the object of the invention to provide a resource allocation method for D2D communication in a wireless network, which minimizes D2C, C2D and inter-D2D interference in a cell. The invention aims also at improving the overall system performance, while requiring reduced signaling overhead. Specifically, a significant reduction in signaling efforts shall be achieved. Moreover, the present invention also intends to improve robustness against location information inaccuracies. Another goal of the present invention is an increased resource reuse among D-UES as well as reduced inter-cell interference.

The above-mentioned object of the present invention is achieved by the solution provided in the enclosed independent claims. Advantageous implementations of the present invention are further defined in the respective dependent claims. In particular, in order to minimize the impact of mutual interference between D2D and cellular communications, the invention exploits knowledge on D-UE and C-UE transmitter locations, preferably applies sectoring of a considered cell area and performs radio resource allocation in such a way that spatial separation between interferer and affected/victim receiver are maximized.

In a first aspect the present invention provides a radio resource management method for D2D communication in a wireless network, comprising: determining angle information with respect to a base station for at least one C-UE and/or at least one D-UE within at least one cell of the wireless network, assigning available radio resources to the at least one C-UE and/or the at least one D-UE, selecting, for at least one D-UE pair, at least one peer UE from the at least one C-UE and/or the at least one D-UE assigned with available radio resources based on the angle information of the at least one D-UE pair and of the at least one C-UE and/or the at least one D-UE, and sharing at least a part of the radio resources assigned to the at least one peer UE with the at least one D-UE pair.

The wireless network may be a cellular network. A "cell" in the present invention may be a cell of a known cellular network, i.e. may define an area, in which each user is associated to an access node, e.g. a base station. However, a "cell" in the present invention may also define an area in the network, in which a set of the radio resources is commonly managed, e.g. an association of radio resources to an access node. That means, the available radio resources may be split, in order to form "cells".

Each C-UE and/or D-UE that is assigned available radio resources in a cell of the wireless network may receive one resource block. For example, the radio resources may be PRBs as used in LTE technology, and each UE may receive one PRB.

The angle information may be determined by measuring AoA information for some or for each C-UE and/or D-UE. Alternatively, several access nodes may aggregate Uplink-Time Difference of Arrival (UTDoA) measurements. Additionally, location information obtained e.g. by GPS may be measured. In the present invention, any technique that can detect angle information of one UE, a plurality of UEs, or even of all UEs in the cell of the wireless network with respect to an access node, e.g. a base station may be employed.

The peer UE may only be a C-UE, for example, if no available radio resources are assigned to at least one D-UE, for instance if the number of available radio resources is not larger than the number of C-UEs. The peer UE may also be a D-UE, if available radio resources are assigned to at least one D-UE. The at least one peer UE may also be a combination of at least one C-UE and at least one D-UE. The D-UE pair may reuse the shared radio resources of the peer UE completely. Alternatively, a part of the radio resources of the D-UE pair is a reuse resource, while another part is an assigned available radio resource, and preferably orthogonal to the reused resource. That means, even a D-UE that has been assigned with available radio resources can reuse (preferably orthogonal) radio resources of a peer UE, in order to increase its amount of radio resources.

The decision on the peer UE selection can also depend on other factors. For example, it can depend on a certain priority. That is, when C-UEs have highest priority, only radio resources of D-UEs can be reused by the at least one D-UE pair. Further factors may be a maximum angular distance, a maximum angular and radial distance, and a received signal power of SINR.

By the method of a first aspect an efficient reuse of the radio resources from C-UES and/or D-UEs by D-UE pairs can be realized. The method may be performed without significantly increased signaling, overhead and processing delays, because accurate location information is not required. Accordingly, the method shows an improved robustness against inaccuracies of the angle information. Further, the overall system performance is increased. The method is able to manage D2D communications underlying a cellular network infrastructure and thereby minimize C2D, D2C, and inter-D2D interference.

In a first implementation form of the radio resource management method according to the first aspect, the method further comprises: determining, as the at least one peer UE, at least one UE located from the at least one D-UE pair at an angular distance being larger than a determined threshold value.

The determined threshold value may be UE-specific. The threshold value can also depend on factors like a certain priority, a target SINR, or QoS requirements. The threshold value may be pre-determined, may be calculated dynamically, or may be fixed.

The first implementation form provides a simple extension of the first aspect with low signaling and overhead. By the determined threshold value, the interference between the at least one peer UE and the D-UE pair using the same radio resources can be efficiently controlled. In particular, C2D interference may be mitigated by optimal selection of the angular distance threshold.

In a second implementation form of the radio resource management method according to the first aspect, the method further comprises: determining, as the at least one peer UE, at least one UE located at a maximum angular distance from a transmitter D-UE of the at least one D-UE pair.

The transmitter D-UE may change over time depending for instance on the communication type, e.g. gaming is bidirectional, whereas video sharing can be unidirectional. The method of the second implementation form may accordingly determine the maximum angular distance dynamically based on a changing transmitter D-UE.

The second implementation form provides a simple extension of the first aspect with low signaling and overhead. Instead of a threshold value, the largest angular distance is chosen, which ensures that the interference between at least one peer UE and the D-UE pair using the same radio resources is minimized.

In a third implementation form of the radio resource management method according to the first aspect, the method further comprises: dividing the at least one cell into a plurality of sectors, determining a reference angle of at least one sector based on the angle information of at least one UE in the at least one sector, determining a peer sector for the at least one sector, wherein the peer sector is the sector having a reference angle with the greatest angular difference compared to the reference angle of the at least one sector, and determining, as the at least one peer UE, at least one UE located in the peer sector of the sector including the at least one D-UE pair.

The sectors thus may be angular sectors, i.e. each sector has a certain angle. The reference angle of a sector may depend on a part of its UEs, or may depend on all UEs. For determining the reference angle, D-UEs and/or C-UEs within a sector may be considered. The sectors may be virtual, i.e. may define radio resource splits in a cell, and thus, may not be the same as conventional cell sectoring based on antenna radiation patterns.

Instead of considering distances between individual UEs, the at least one cell is clustered into possibly unequally sized sectors. Then pairs of sectors, wherein the reference sector contains the D-UE pair under consideration and the peer sector, are formed. By this splitting of the at least one cell into a number of variable or fixed sized sectors, the system capacity can be improved by increased reuse of radio resources among D-UEs, and at the same time mitigating intra- and inter-cell interference efficiently. By the relation of the reference angles of reference sector and peer sector a distance-aware resource allocation is provided, which reduces the interference. Further, a significant reduction in signaling efforts is achieved by the method. By use of the sectors, the method is moreover particularly robust against inaccurately determined angle information.

In a fourth implementation form of the radio resource management method according to the third implementation form of the first aspect, the method comprises: dividing the at least one cell into a plurality of sectors based on UE density.

The UE density may define a number of users per area, e.g. per sector, i.e. may be a physical UE density. However, the UE density may also define a traffic load, a data load or service requirements per area, e.g. per sector. In the first case, the number of UEs in each sector may be the same, and may depend on the total amount of available radio resources and of UEs in the at least one cell of the wireless network. The sectoring based on a UE density can ensure that each sector is provided with a sufficient amount of radio resources to be shared with D-UE pairs in another sector.

In a fifth implementation form of the radio resource management method according to the third implementation form of the first aspect, the method further comprises: dividing the at least one cell into a plurality of sectors of a fixed number.

Each sector can, for example, cover the same angular range. The sectoring into a fixed number of sectors is the simplest option in terms of resource allocation. Orthogonal radio resources may be assigned in one sector, and may be reused by its peer sector.

In a sixth implementation form of the radio resource management method according to any of the third to fifth implementation forms of the first aspect, the method comprises: determining, as the at least one peer UE, at least one UE in the peer sector that has the maximal angular distance from the at least one D-UE pair.

By choosing the at least one most distanced UE within the peer sector, the interference can be maximally reduced.

In a seventh implementation form of the radio resource management method according to the first aspect as such or any of the previous implementation forms of the first aspect, the method comprises: defining an exclusion zone in the at least one cell of the wireless network, and determining, as the at least one peer UE, no D-UE located within the exclusion zone.

Also more than one exclusion zone may be defined in a cell. An exclusion zone may, for instance, be defined around a base station in the at least one cell, or around a center of the at least one cell. An exclusion zone may also lie around an obstacle within the cell. An exclusion zone may have a circular shape (e.g. when based on radial distance), but may also have a non-circular shape. The exclusion zone may be different in each sector, i.e. position, shape and size may differ from sector to sector. Generally, an exclusion zone is an area, from which UEs may not be selected as peer UEs.

The definition of an exclusion zone may further lower the danger of interference. For example, when an exclusion zone is defined around a base station, peer UEs located in near vicinity of the base station can be avoided, thus reducing D2C interference.

In an eight implementation form of the radio resource management method according to any of the third to seventh implementation forms of the first aspect, the method comprises: measuring distance information from a center of the at least one cell of the wireless network for the at least one C-UE and/or the at least one D-UE, dividing at least one of the plurality of sectors into tiles, determining a central point of at least one tile based on the distance information of at least one UE in the at least one tile, determining, as the at least one peer UE, at least one UE located in a tile with a central point having a determined distance from a central point of the tile including the at least one D-UE pair.

The distance information may, for example, be determined based on Time of Arrival (ToA) measurements or a path loss estimate. The at least one central point may be determined by the average radial distance of C-UEs and/or D-UEs in a tile, alternatively by the average angular distance of C-UEs and/or D-UEs in the tile, alternatively based on a subset of UEs in the tile, or alternatively based on an interpolation of coordinates of the corner points of the tile.

The determined distance may be pre-determined, fixed, or selected dynamically. For example, when a peer UE is determined for a D-UE pair, a peer UE from a tile with maximum distance to the tile of the D-UE pair may be selected. If this is not possible, because e.g. all UEs in said most distanced tile are already sharing their resources, the tile with the second largest distance from the tile of the D-UE pair may be selected. It is also possible to choose the peer tile, from which the peer UE is selected, based on the radial distance from a center of the cell of the reference tile, in which the D-UE pair is located. That means, for a reference tile radially closer to the center of the cell, a peer tile radially farther away from the center is determined, and for a reference tile radially farther away from the center of the cell, a peer tile radially closer to the center is determined.

By using additionally the radial distance information, i.e. by applying the division into radial tiles, the interference caused by the proposed resource allocation can be further reduced.

In a ninth implementation form of the radio resource management method according to the first aspect as such or any of the previous implementation forms of the first aspect, the method comprises: adapting a transmit power of the at least one peer UE based on a measured or estimated interference caused by the at least one D-UE pair, and/or adapting a transmit power of a transmitter D-UE of the at least one D-UE pair based on a measured or estimated interference caused by the at least one peer UE.

By providing a higher priority to the C-UEs in this implementation form, interference caused by D2D transmission can be compensated for efficiently. Thereby a desired cellular target SINR may be achieved.

By providing a higher priority to the D-UEs in this implementation form, interference caused by cellular transmission can be compensated for efficiently. Thereby a desired D2D target SINR may be achieved. In particular the performance of the presented sectoring concept can be improved by applying the power control on established D2D links after radio resources have been assigned.

In a tenth implementation form of the radio resource management method according to the ninth implementation form of the first aspect, the method comprises: transmitting to the at least one peer UE and/or the at least one transmitter D-UE, respectively, a delta value indicating a transmit power increase or decrease depending on a constellation between the at least one peer UE and the at least one D-UE pair.

The constellation between peer UE and D-UE pair may be defined by a peer sector configuration, if a sectoring-based RA scheme is used. The delta value may depend on the angular and/or radial distances of sectors and/or tiles, i.e. in terms of reference angels. However, the constellation may also depend on the determined threshold value of an angular distance between peer UE and D-UE pair mentioned above, i.e. if a RA scheme without sectoring is used. The delta value may also depend on QoS/QoE requirements or received signal power levels. The delta value may be an explicit value or a level indicator, for instance, a quantized value, for which different granularities may be used.

The delta value indicating transmit power increase/decrease facilitates efficient signaling of the transmit power control commands.

In an eleventh implementation form of the radio resource management method according to the first aspect as such or any of the previous implementation forms of the first aspect, the method comprises: exchanging selection information concerning the selection of the least one peer UE with at least one other cell of the wireless network.

The selection information may include sectoring information, i.e. information about the number of sectors, their reference angles, their angular ranges etc. The selection information may also include the angle information determined for UEs, for instance based on AoA or TDoA. The selection information may also include tile information, i.e. information about the number of tiles, their reference angles, their radial ranges etc. The selection information can be coordinated and managed by one or more base stations of one or more cells, which share selection information with another. Alternatively, a central entity may coordinate selection information of a plurality of cells.

By exchanging selection information with at least one other cell, the resource allocation in the cell and at least one neighboring cell can be coordinated. Thereby, inter-cell interference, i.e. interference between UEs in different cells, can be reduced in a multi-cell scenario.

In a twelfth implementation form of the radio resource management method according to the eleventh implementation form of the first aspect, the method comprises: assigning the available radio resources to the at least one UE separately for UEs located in cell edge regions and UEs located in cell center regions, wherein for UEs located in cell edge regions available radio resources are assigned according to selection information received from at least one neighboring cell of the wireless network.

The cell edge regions may also be referred to as outer annulus regions. The size of the cell edge regions may depend on the interference imposed by a neighboring cell on the D-UE pairs in said edge region. Alternatively, the size of the cell edge regions may depend on interference imposed on C-UEs or based on experienced SINR.

The radio resources assigned to UEs in cell edge regions may also depend on an antenna orientation of the cell, for example, a tilting of the antenna.

By the distinction between cell edge regions and cell center regions, inter D2D and/or cell edge C-UE to D2D interference can be prevented.

In a thirteenth implementation form of the radio resource management method according to the first aspect as such or any of the previous implementation forms of the first aspect, the method further comprises: sharing the at least a part of the radio resources assigned to the at least one peer UE with the at least one D-UE pair in at least one determined time resource.

The radio resources can be shared also in some determined time resource. For example sharing of radio resources may be carried out only in odd or only in even time slots. The information about the time resource used for sharing is preferably sent to neighboring cells. The determined time resource used for sharing can also be chosen and varied dynamically.

By using a determined time resource for the sharing of the radio resources, inter-cell interference, particularly inter-D2D interference, may be reduced.

In a second aspect the present invention provides a computer program product comprising a program code for performing the radio resource management method according to the first aspect as such or any of the implementation forms of the first aspect when executed on a computer.

The computer program of the second aspect when running on a computer provides the same advantages as described above in relation to the method of the first aspect.

In a third aspect the present invention provides a base station for managing radio resources of Device-to-Device, D2D, communication in a wireless network, comprising: a determination unit configured to determine angle information for at least one C-UE and/or at least one D-UE within at least one cell of the wireless network, a resource allocation unit configured to assign available radio resources to the at least one C-UE and/or the at least one D-UE, a selecting unit configured to select, for at least one D-UE pair, at least one peer UE, from the at least one C-UE and/or the at least one D-UE assigned with available radio resources based on the angle information of the at least one D-UE pair and the at least one C-UE and/or the at least one D-UE, wherein the resource allocation unit is configured to share at least a part of the radio resources assigned to the at least one peer UE with the at least one D-UE pair.

The base station may comprise further units, e.g. a control unit configured to manage the power control or a sending unit configured to send control information and/or radio resource allocation information to the UEs, e.g. by signaling.

In a first implementation form of the base station according to the third aspect, the selection unit is configured to determine, as the at least one peer UE, at least one UE located from the at least one D-UE pair at an angular distance being larger than a determined threshold value.

In a second implementation form of the base station according to the third aspect, the selection unit is configured to determine, as the at least one peer UE, at least one UE located at a maximum angular distance from a transmitter D-UE of the at least one D-UE pair.

In a third implementation form of the base station according to the third aspect, the base station further comprises a dividing unit configured to divide the at least one cell into a plurality of sectors, determining a reference angle of at least one sector based on the angle information of at least one UE in the at least one sector, determining a peer sector for the at least one sector, wherein the peer sector is the sector having a reference angle with the greatest angular difference compared to the reference angle of the at least one sector, wherein the selection unit is configured to determine, as the at least one peer UE, at least one UE located in the peer sector of the sector including the at least one D-UE pair.

In a fourth implementation form of the base station according to the third implementation form of the third aspect, the dividing unit is configured to divide the at least one cell into a plurality of sectors based on UE density.

In a fifth implementation form of the base station according to the third implementation form of the third aspect, the dividing unit is configured to divide the at least one cell into a plurality of sectors of a fixed number.

In a sixth implementation form of the base station according to any of the third to fifth implementation forms of the third aspect, the selection unit is configured to determine, as the at least one peer UE, at least one UE in the peer sector that has the maximal angular distance from the at least one D-UE pair.

In a seventh implementation form of the base station according to the third aspect as such or any of the previous implementation forms of the third aspect, the resource allocation unit is configured to define an exclusion zone in the at least one cell of the wireless network, and the selecting unit is configured to determine, as the at least one peer UE, no D-UE located within the exclusion zone.

In an eight implementation form of the base station according to any of the third to seventh implementation forms of the third aspect, the base station comprises: a measuring unit configured to measure distance information from a center of the at least one cell of the wireless network for the at least one C-UE and/or the at least one D-UE, wherein the dividing unit is configured to divide at least one of the plurality of sectors into tiles, determine a central point of at least one tile based on the distance information of at least one UE in the at least one tile, and the selection unit is configured to determine, as the at least one peer UE, at least one UE located in a tile with a central point having a determined distance from a central point of the tile including the at least one D-UE pair.

In a ninth implementation form of base station according to the third aspect as such or any of the previous implementation forms of the third aspect, the base station comprises: an adaption unit configured to adapt a transmit power of the at least one peer UE based on a measured or estimated interference caused by the at least one D-UE pair, and/or configured to adapt a transmit power of a transmitter D-UE of the at least one D-UE pair based on a measured or estimated interference caused by the at least one peer UE.

In a tenth implementation form of the base station according to the ninth implementation form of the third aspect, the base station comprises: a transmitting unit configured to transmit to the at least one peer UE and/or the at least one transmitter D-UE, respectively, a delta value indicating a transmit power increase or decrease depending on a constellation between the at least one peer UE and the at least one D-UE pair.

In an eleventh implementation form of the base station according to the third aspect as such or any of the previous implementation forms of the third aspect, the base station comprises a communication unit configured to exchange selection information concerning the selection of the least one peer UE with at least one other cell of the wireless network.

In a twelfth implementation form of the base station according to the eleventh implementation form of the third aspect, the resource allocation unit is configured to assign the available radio resources to the at least one UE separately for UEs located in cell edge regions and UEs located in cell center regions, wherein for UEs located in cell edge regions available radio resources are assigned according to selection information received from at least one neighboring cell of the wireless network.

In a thirteenth implementation form of the base station according to the third aspect as such or any of the previous implementation forms of the third aspect, the resource allocation unit is configured to share at least a part of the radio resources assigned to the at least one peer UE with the at least one D-UE pair in at least one determined time resource.

The base station of the third aspect and of the various implementation forms of the third aspect provides the same advantages as the method of the first aspect and of the various implementation forms of the first aspect, respectively.

In general, by the above-mentioned aspects of the present invention, the effect of mutual interference is reduced and the system performance is improved by managing radio resource reuse based on the angle information. For the angle information preferably a network-based positioning technique is used at the base station, which provides sufficient positioning accuracy at comparable low signaling efforts. The aspects of the present invention also reduce the signaling overhead.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms of the present invention will be explained in the following description of specific embodiments in relation to the enclosed drawings, in which.

DETAILED DESCRIPTION OF EMBODIMENTS

Figure 1:
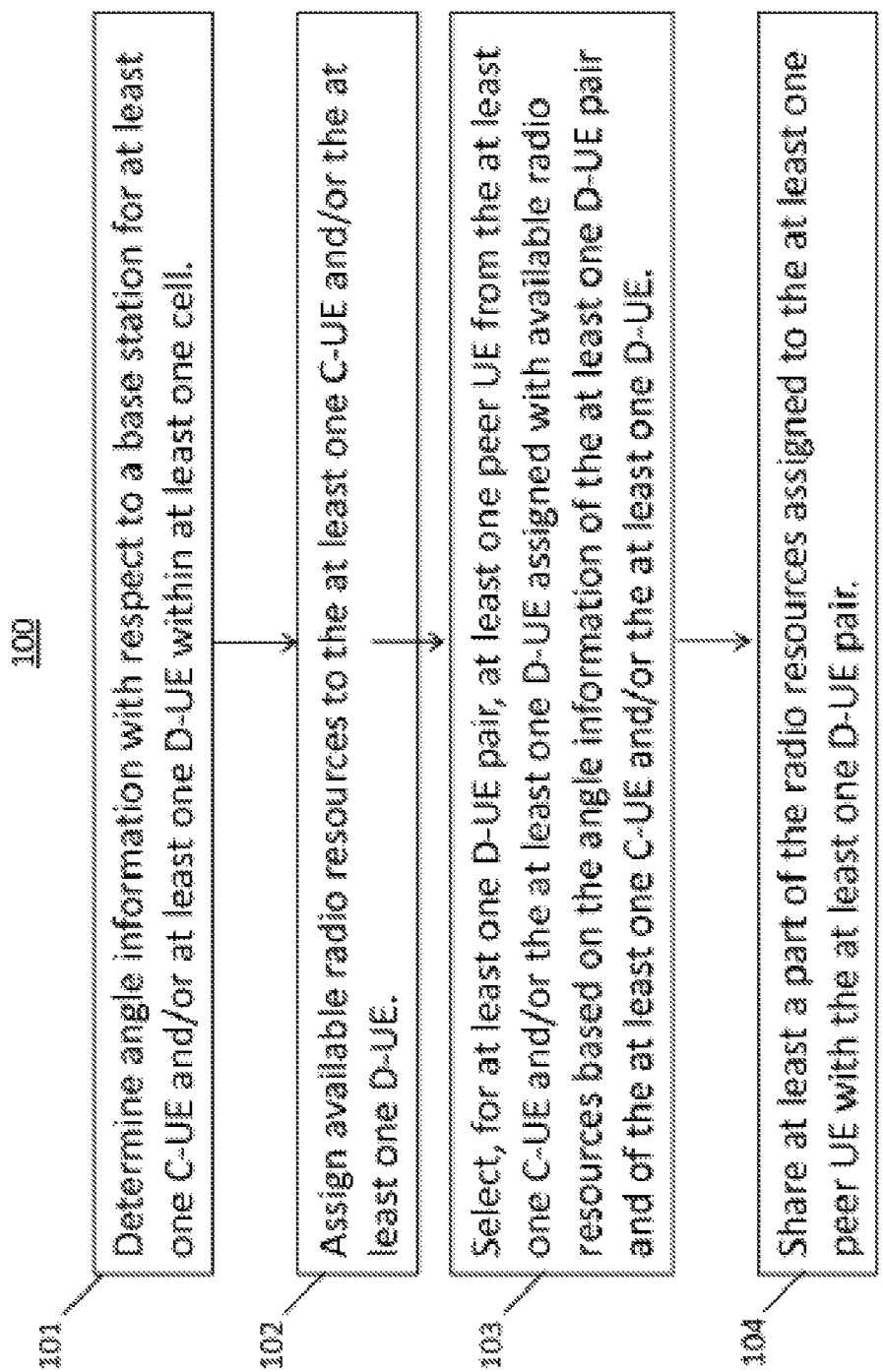
FIG. 1 shows a RA allocation scheme according to an embodiment of the present invention.

FIG. 1 shows a method according to a basic embodiment of the present invention, which manages radio resources for D2D communications in a wireless network.

In a first step 101 of the method 100, angle information with respect to a base station is determined for at least one C-UE and/or at least one D-UE within a cell. For determining the angle information, for example, AoA or TDoA measurements may be performed. The angle information can be performed by the base station of the cell. However, a managing entity may be provided to obtain the angle information for one or a plurality of cells.

In a second step 102 available radio resources are assigned to the at least one C-UE and/or the at least one D-UE. The radio resources may be resource blocks, preferably PRBs. The radio resources may be assigned by the base station of the cell.

In a third step 103, for at least one D-UE pair, at least one peer UE from the at least one C-UE and/or the at least one D-UE assigned with available radio resources is selected based on the angle information of the at least one D-UE pair and of the at least one C-UE and/or the at least one D-UE. Preferably, based on the angle information, a peer UE having at least a certain distance or even the maximum distance from the D-UE pair is selected. Different schemes, with and without sectoring the cell, for selecting peer UEs are explained below.

In a fourth step 104, at least a part of the radio resources assigned to the at least one peer UE is shared with the at least one D-UE pair. That means, the at least one D-UE pair reuses at least partly or completely the radio resources of the peer UE. The D-UE pair may thereby only use the radio resources shared with the peer UE, or may use the shared radio resources in addition to assigned radio resources.

Figure 2:
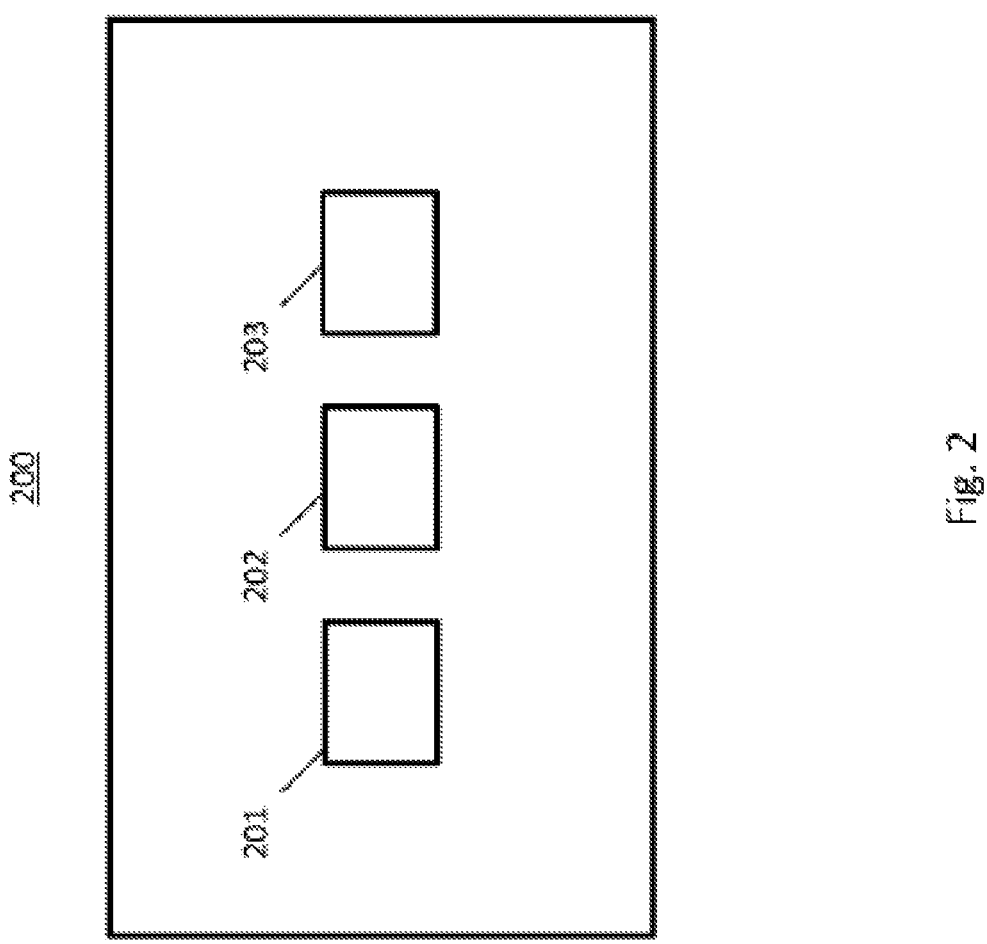
FIG. 2 shows a base station for performing a RA allocation scheme according to an embodiment of the present invention.

FIG. 2 shows a base station 200 according to a basic embodiment of the present invention, which is configured to manage radio resources for D2D communications in a wireless network according to the basic method shown in FIG. 1.

The base station 200 includes at least a determination unit 201, a resource allocation unit 202 and a selecting unit 203. These units 201, 202 and 203 may be included as functions in one larger unit, e.g. in a processor or a micro-controller. These units 201, 202 and 203 may, however, also be separate entities, which are configured to communicate with another.

The determination unit 201 is at least configured to determine angle information for at least one C-UE and/or at least one D-UE within at least one cell of the wireless network. The base station 200 may be an access node in said cell. As described above, the angle information may be determined by measuring AoA or TDoA of the UEs.

The resource allocation unit 202 is configured to assign available radio resources to the at least one C-UE and/or the at least one D-UE. The resource allocation unit 202 is also configured to share at least a part of the radio resources assigned to at least one peer UE with at least one D-UE pair.

The at least one peer UE is selected by the selecting unit 203. In particular, the selecting unit 203 is configured to select, for at least one D-UE pair, at least one peer UE, from the at least one C-UE and/or the at least one D-UE assigned with available radio resources based on the angle information of the at least one D-UE pair and the at least one C-UE and/or the at least one D-UE, as determined by the determination unit 201. The below explained different schemes for selecting the peer UE, with and without sectoring the cell, may all be carried out by the selecting unit 203 of one or more base stations 200 in the network.

In the following further embodiments are described, in particular schemes for selecting the peer UE, which are all extensions to the basic embodiments shown in FIGS. 1 and 2, respectively. In particular, specific and advantageous implementations of the steps 101-104 of the method, and the units 201-203 of the base station 200, which may perform the steps 101-104, are described.

Figure 3:
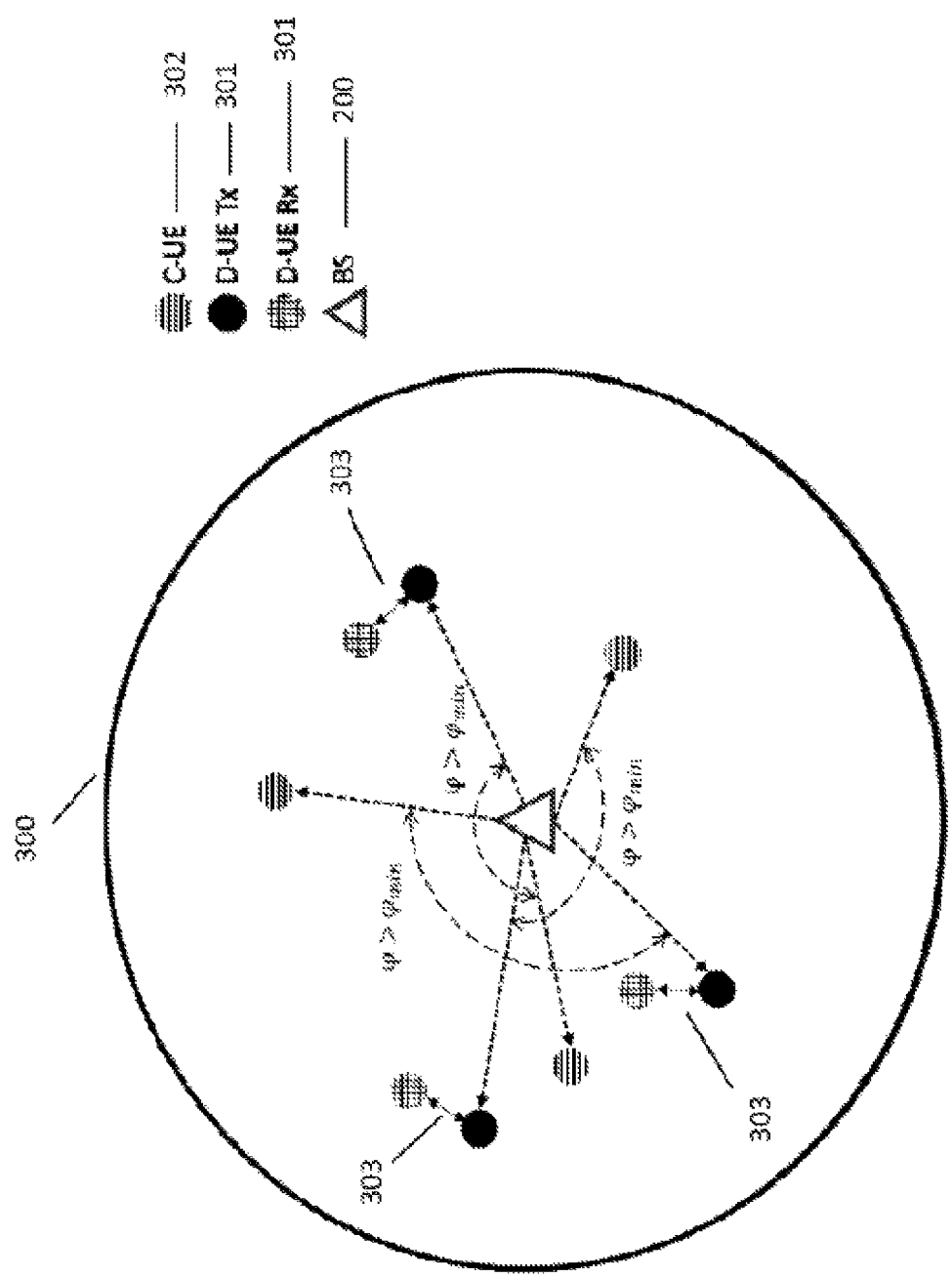
FIG. 3 shows a RA allocation scheme without sectoring according to an embodiment of the present invention.

For the following description of more specific embodiments of the present invention is exemplarily considered— as shown in FIG. 3—a wireless network with at least one circular cell 300 with an arbitrary number of UEs, which are classified into C-UEs 302 and D-UEs 301, e.g. based on D2D discovery techniques. Of course, the present invention works likewise for cells 300 having other shapes. Further, knowledge about angle information with respect to a base station (BS) 200 of the at least one cell 300 is assumed to be available for at least a plurality, preferably all of the UEs 301 and 302 at the BS 200 of the cell 300, or at a separate network management unit (not shown). The BS 200 may be configured as described above with reference to FIG. 2. For example, in order to determine said angle information, the BS 200 may be configured to perform AoA measurements per UE 301, 302, and is able to cluster UEs 301, 302 with respect to their angular direction. Alternatively, more than one BS 200 may cooperate and aggregate UTDoA measurements for determining the angle information. Once the angle information is available at a base station 200 or network management unit, different kinds of RA schemes, in particular schemes for selecting the peer UE, based on the above-described general method 100 may be envisioned. These schemes generally make RA decisions based on the angle information, as does the basic method 100. Sectoring, which is explained further below, of the at least one cell 300 can advantageously be applied, in order to improve the robustness against inaccurate angle information, and to reduce the information exchange between UEs 301, 302 and the BS 200.

FIG. 3 illustrates a RA allocation scheme for finding peer UEs according to an embodiment of the present invention, which is an extension of the embodiments according to FIGS. 1 and 2, respectively. In this scheme the network, i.e. advantageously an entity of the network, preferably the BS 200, assigns to a certain D-UE pair 303 (also referred to as a D2D link between two D-UEs 301, wherein one D-UE 301 may be a transmitter D-UE (Tx) and the other D-UE 301 may be a receiver D-UE (Rx)) the radio resources, which preferably consist of at least one PRB, of a peer C-UE 302 that is at an angular distance $\varphi$, wherein $\varphi > \varphi_{min}$ and $\varphi_{min}$ is a determined angular distance threshold value. The determined threshold value is advantageously selected so as to control the interference from the selected peer C-UE 302 to the considered D-UE pair 303 reusing its radio resources. Since the D2D transmission is envisioned to be in cellular UL, and since the distance between a D-UE transmitter (Tx) 301 of the D-UE pair 303 and the potential victim BS 200 is not accounted for in the RA presented in FIG. 3, the D2C interference is not completely eliminated in this scheme. However, the C2D interference can be mitigated by an optimal selection of the angular distance $\varphi_{min}$. One constraint with this angle information based scheme without sectoring is the achievable angular resolution, i.e. it may be difficult to differentiate between two different UEs 301 or 302 at the same angles, but at different distances from the BS 200. Advantageously, TDoA measurements may thus be additionally used to determine the radial distance of the UEs 301, 302 from the BS 200.

In another RA allocation scheme (not illustrated but similar to the embodiment of FIG. 3) according to an embodiment of the present invention, which is an extension of the embodiments shown in FIGS. 1 and 2, respectively, instead of defining a fixed angular distance threshold value $\varphi_{min}$, as in the scheme shown in FIG. 3, the network, e.g. the BS 200, may assign to a certain D-UE pair 303 the radio resources of the C-UE 302 that is at the maximum angular distance from the transmitter D-UE 301 of the considered D-UE pair 303. Preferably, the unassigned D-UE pair 303 may particularly be assigned with the radio resources of the peer C-UE 302 that has the n-th largest angular distance, n=1, 2, 3, 4, . . . , since more than one D-UE pair 303 may have a common C-UE 302 with a largest angular distance. Preferably, the radio resource assignment is done starting with the radio resources of C-UEs 302, but can be followed up by sharing the radio resources of already allocated D-UEs 301, also based on the largest angular distance.

Instead of considering the distances between individual UEs 301 and/or 302 as in the embodiments described above, and thus depending to a larger extent on the preciseness of the angle information with respect to the BS 200, at least one cell 300 of the wireless network may be clustered into possibly unequal sized sectors depending, for example, upon observed UE densities, i.e. D-UE 301 and/or C-UE 302 densities, in the at least one cell 300. To this end, for example, clustering techniques, such as k-Means (as described e.g. in 'G. Frahling and C. Sohler, "*A Fast k-Means Implementation Using Coresets*", Int. Journal Computer Geometry Applications, vol. 18, no. 6, 2008, pp. 605-625'), Neural Gas (as described e.g. in 'T. Martinetz and K. Schulten "*A "Neural-Gas" network learns topologies*", Artificial Neural Networks, pp: 397-402, 1991' or in 'B. Fritzke, "*A Growing Neural Gas Network Learns Topologies*", Advances in Neural Information Processing Systems 7, MIT Press, 1995, pp. 625-632'), or Hierarchical or Partition based clustering (as described e.g. in G. W. Milligan and M. C. Cooper, "*Methodology review: Clustering methods*", Applied Psychological Measurement, 11.4, 1987, p. 329-354') may be used for sectoring the at least one cell 300.

All sectoring-based radio RA schemes of the present invention, which are described in the following, aim at identifying pairs of sectors, wherein the sharing of the radio resources is enabled by establishing, for example, maximum spatial distances between sectors that are supposed to share the same set of radio resources. In general, sectoring may be performed with respect to D-UEs 301, C-UEs 302, or both UE categories. A pair of sectors sharing radio resources consists typically of a reference sector and its peer sector. Further, a sector pair is preferably determined based on UE specific angle information with respect to a base station 200 of the at least one cell 300.

Figure 4:
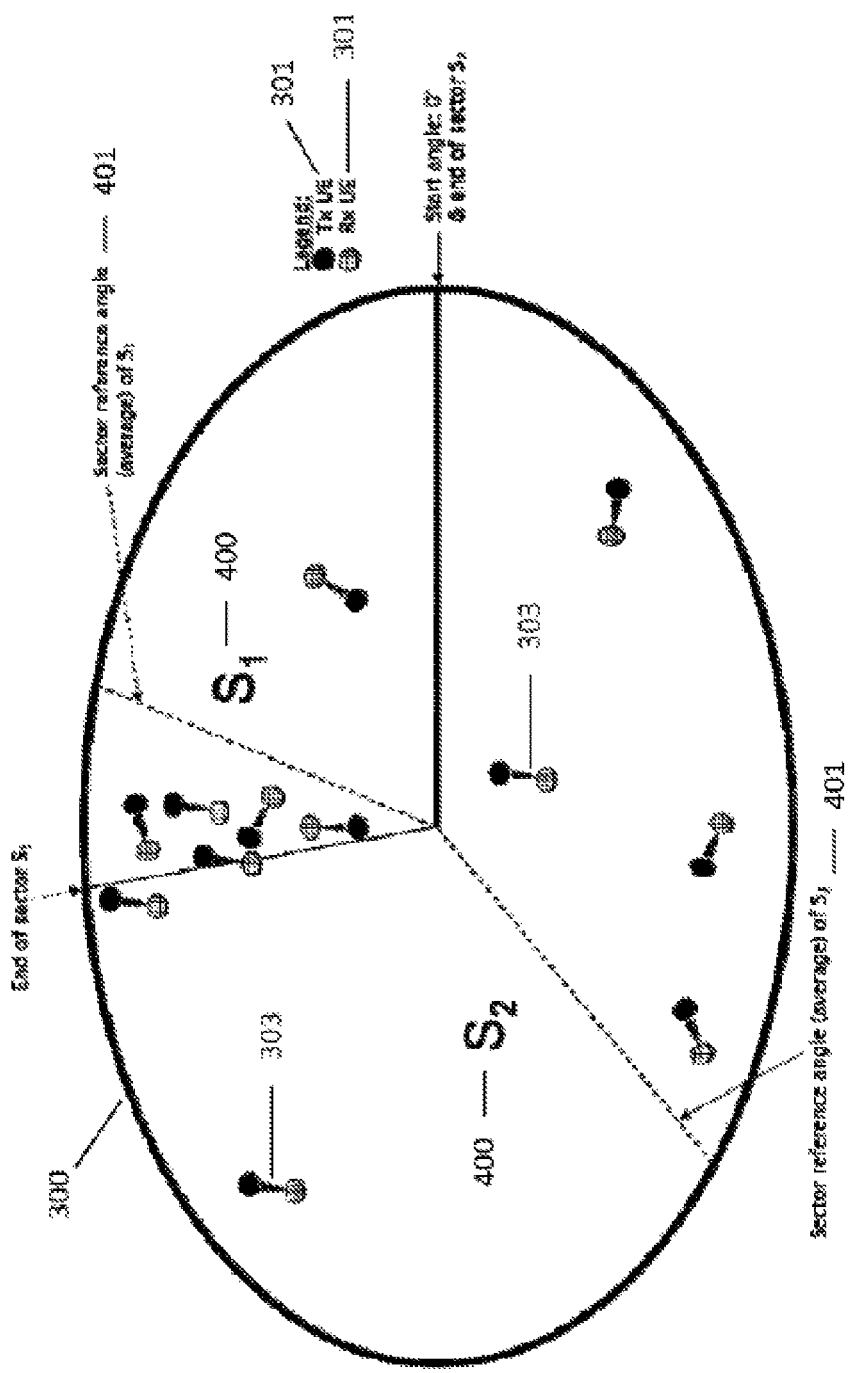
FIG. 4 shows a RA allocation scheme with sectoring according to an embodiment of the present invention.

FIG. 4 shows an embodiment of the present invention using a sectoring-based RA scheme for finding peer UEs, and is an extension of the embodiments shown in the FIGS. 1 and 2. As shown in FIG. 4, the at least one cell 300 of the network is divided into a plurality of sectors 400. In FIG. 4, the sectors are labeled with $S_1$ and $S_2$. Each sector 400 has a start angle, e.g. 0° for sector $S_1$ in FIG. 4, and an end angle, at which it is delimited to a neighboring sector. In FIG. 4, the sector $S_1$ is delimited to sector $S_2$ at its start and end angles, because only two sectors exist. The same applies for sector $S_2$. A sector reference angle 401 of some or preferably each sector 400 of the at least one cell 300 can be determined, e.g. as the average angle information of all UEs belonging to that particular sector 400. In FIG. 4, the sector reference angles 401 (based on average angle information of all UEs) of the sectors $S_1$ and $S_2$ are shown. Other approaches, such as the median of the angular information values are also possible. In essence, a sector reference angle 401 of a sector 400 refers preferably to an angle information value that reflects the user distribution and potentially a concentration in a particular cell 300. Further, a pair-specific D2D reference angle can be defined, for example, as the average or the median angle of a transmitter D-UE 301 of a D-UE pair 303, i.e. a Tx D-UE, and a receiver D-UE 301 of a D-UE pair 303, i.e. a Rx UE, or either angle information, i.e. the Tx D-UE or Rx D-UE angle information, respectively.

In FIG. 4 an exemplary D-UE distribution is depicted in a cell 300 of the wireless network. Sector reference angles 401 are determined based on the average of all UE-specific angle information per sector 400. For identifying at least one peer UE that shall share its radio resource with a considered D-UE pair 303, for example, only the peer sector of the sector 400 labeled as $S_1$ (here the sector 400 labeled as $S_2$) is checked for potential UEs 301, 302.

The simplest option in terms of RA is to randomly assign radio resources, for example orthogonal PRBs, in one sector 400, and to reuse the same radio resources in its peer sector. More sophisticated solutions may consider the UE-specific angle information of each D-UE pair 303, e.g. determining the transmitter D-UE 301 with maximal angular distance in the respective peer sector.

In general, the respective peer sector 400 for resource sharing with a considered sector 400 is determined based on the sector specific reference angles 401. Further, different constellations of sectoring results are possible, due to a non-uniform user distributions in the at least one cell 300.

Figure 5:
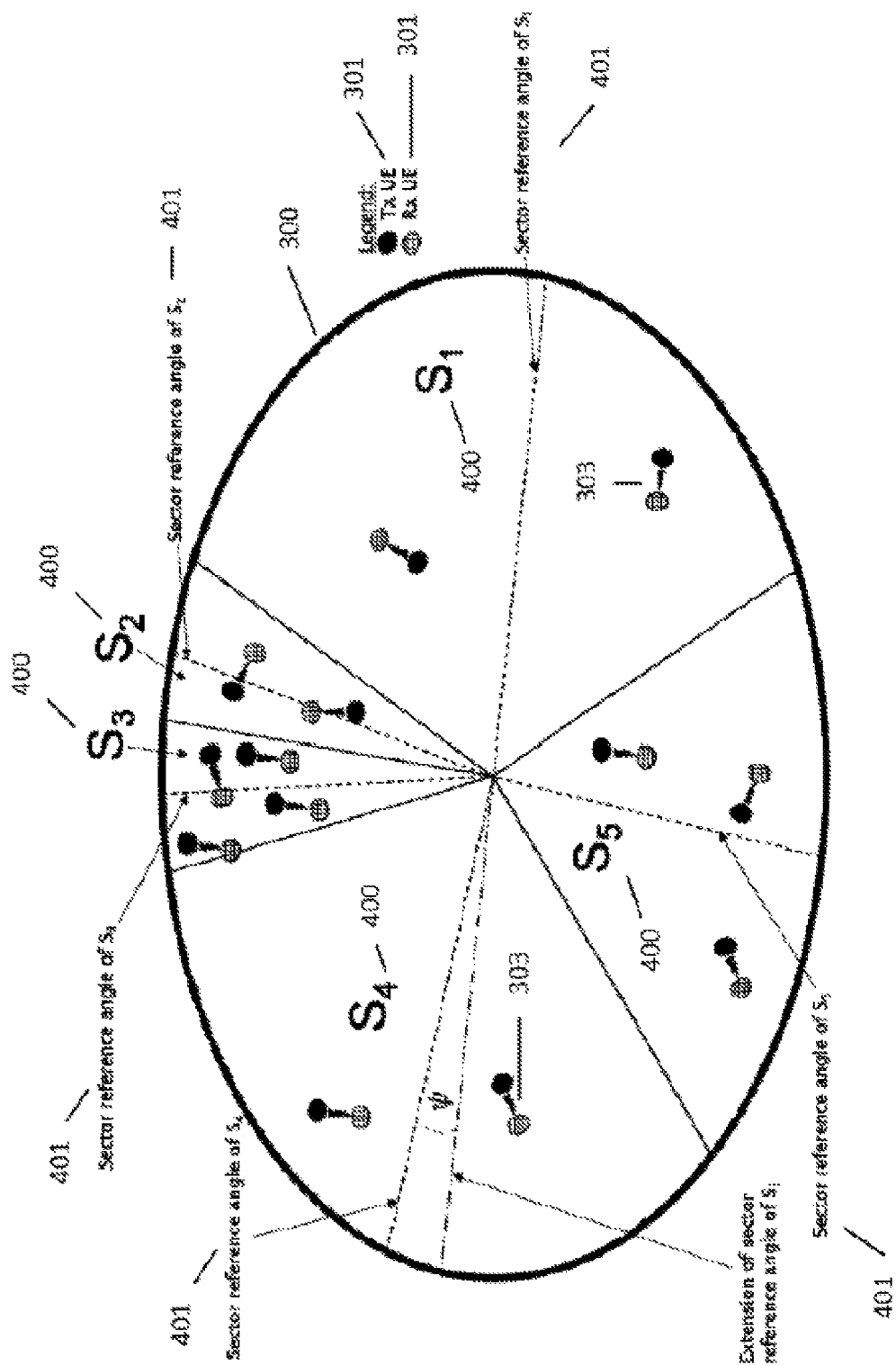
FIG. 5 shows sector and peer sector reference angles based on averaging.

FIG. 5 illustrates another exemplary sectoring result of the embodiment of FIG. 4, and shows respective sector reference angles 401 of each sector 400. In FIG. 5, the cell 300 is divided into the five sectors labeled with $S_1$-$S_5$. For each sector 400 a sector reference angle 401 is determined. For each sector 400 a peer sector can be determined, for example, by calculating the angular difference between the considered sector reference angle 401 plus its extension by 180°, as illustrated for $S_1$ in FIG. 4 by the extension of sector reference angle of $S_1$, and all other sector reference angles 401, as generally expressed by:

$$\psi_k = |\text{mod}(\varphi_{S_i} + 180°, 360°) - \varphi_{S_k}|, \; i \neq k, \; \forall i, k \in \{1, \ldots N_{sectors}\}.$$

Thereby, $N_{sectors}$ is the number of sectors, into which the cell 300 is divided. For example, in FIG. 5 the angular difference $\psi$ between the extension of the sector reference angle of sector $S_1$ and the sector reference angle of sector $S_4$ is illustrated. The angular differences $\varphi_k$ ($\varphi_k \in [0°, 360°]$) are preferably sorted in ascending order based on angular differences. The sector 400 that exhibits minimum angular difference between its own sector reference angle $\varphi_{S_k}$ and the reference angle $\varphi_{S_i}$ of the considered sector 400 plus 180° is preferably selected as peer sector. In FIG. 5 the sectors 400 and their peer sectors are exemplarily illustrated, e.g. the sector 400 labeled as $S_4$ is identified as the peer sector of the sector 400 labeled as $S_1$. However, there may be cases where two sectors 400 chose the same sectors 400 as their peer sector, e.g. both $S_2$ and $S_3$ select $S_5$ as their peer sector. In these cases, it may be assumed that a D-UE pair 303 is always selected in a counter-clockwise direction from a considered sector 400, and the peer UE for resource sharing is then chosen from the respective peer sector in a random manner. Further, the selection of potential D-UE pairs 303, which share radio resources with UEs from peer sectors, can be based on additional context information, e.g. user priorities, QoS requirements, TDoA information, velocity estimates, estimated radio distance between D-UE pairs 303, and the radio distance between the devices, i.e. transmitter (Tx) D-UE 301 and receiver (Rx) D-UE 301, of the D-UE pairs 303.

There are three important parameters that directly influence the sectoring based RA schemes of the present invention: The amount of available radio resources per cell 300, e.g. the number of PRBs ($N_{RB,tot}$), the total number of C-UEs 302 ($N_{cell}$), and the total number of D-UE pairs 303 ($N_{D2D}$). In the following description, a total of $N_{RB,tot}$ PRB radio resources, e.g. one PRB per UE 301 and/or 302, a total of $N_{cell}$ C-UEs 302 and $N_{D2D}$ D-UE pairs 303 is assumed.

In case of a uniform UE distribution, a very simple realization of the sectoring based RA scheme of the present invention is to employ a fixed number of sectors 400, wherein each spatial sector size can be specified using a fixed angular range. The angular ranges of the sectors 400 can be identical, but may differ within a cell 300 or from cell 300 to cell 300. If the UE distribution changes, the angular ranges may also be recalculated, i.e. the angular ranges of the sectors are determined dynamically.

Figure 6:
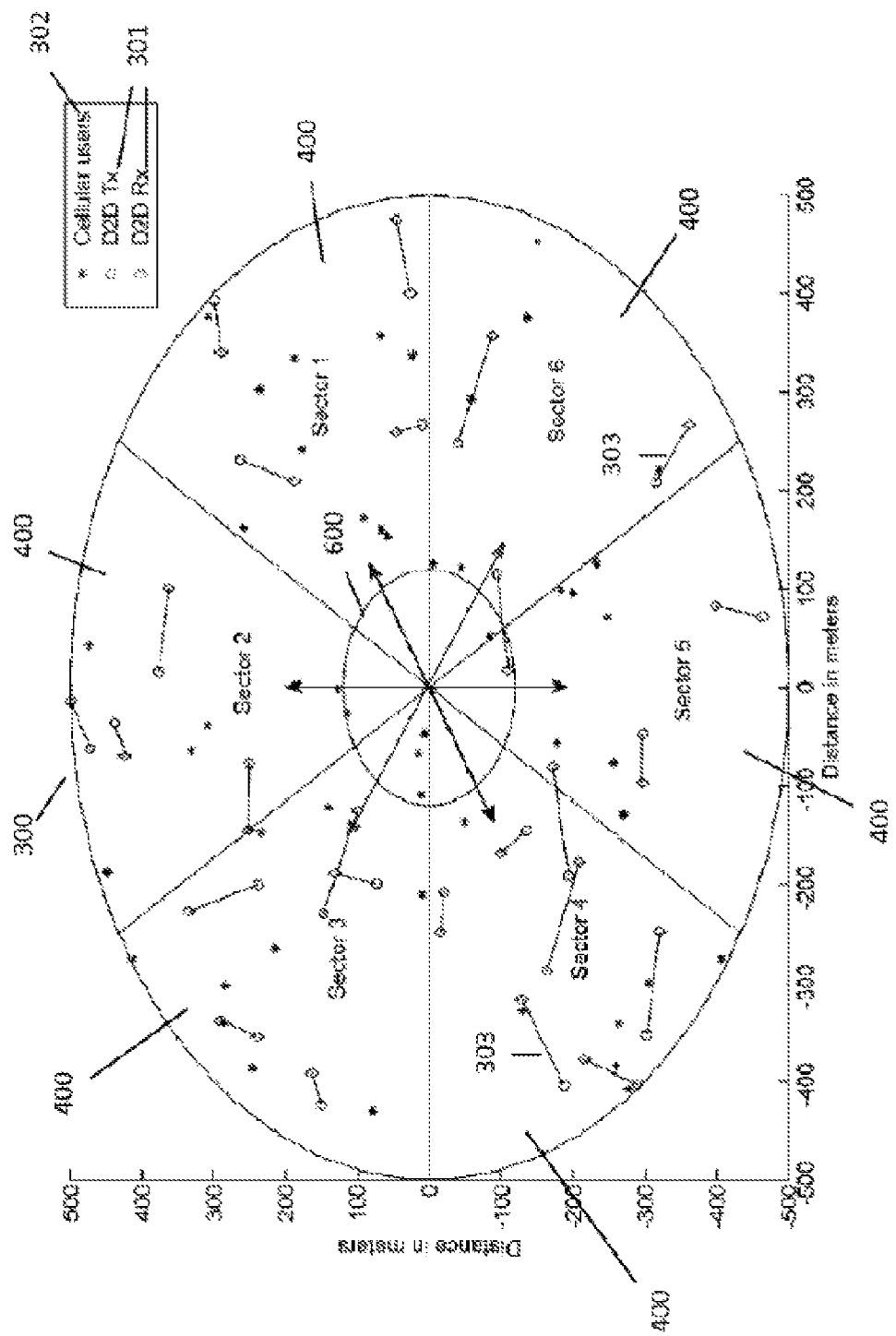
FIG. 6 shows a RA allocation scheme with regular sectoring according to an embodiment of the present invention.

FIG. 6 shows an embodiment of the present invention, which is a specific implementation of the embodiment shown in the FIGS. 4 and 5. A cell 300 of the wireless network is shown, which extends in a first direction by a first distance in meters, shown on the y-axis of FIG. 6, and in a second direction by a second distance in meters, shown on the x-axis of FIG. 6. The cell 300 is sectored into six regular sectors 400, which are labeled with Sector 1-Sector 6. The inner circle shown in FIG. 6 further represents an exclusion zone 600, in which for instance no D-UE transmission is allowed, and from which no peer UE may be selected. The exclusion zone 600 may be circular around a center of a cell 300, e.g. around a BS 200 of the cell 300, but can have other shapes as well. The exclusion zone 600 may be of different size for different cells 300 of the network, or may vary in size dynamically, for example, depending in the number of UEs 301, 302 within the cell 300.

The bi-directional arrows in FIG. 6 indicate peer sectors in the opposite directions, i.e. sectors 400 opposite from another are reference and peer sector. The RA for the D-UE pairs 303 starts, for example, in the sector 400 labeled as "Sector 1". The D-UE pairs 303 belonging to Sector 1 are assigned radio resources of the C-UEs 302 belonging to the peer sector, i.e. the sector 400 labeled as "Sector 4".

Table 1 below, which refers to the sectors 400 of FIG. 6, shows a list of the sectors 400 and their respective peer sectors, in which C-UEs 302 are searched for, in order to share radio resources. D-UE pairs 303 in each sector 400 reuse radio resources given to C-UEs 302 found in the respective peer sector. This approach may be carried out in circular fashion covering 360 degrees of the cell 300.

TABLE 1

| Sector of D2D transmitter | Sector where cellular user is to be searched |
| --- | --- |
| Sector 1 | Sector 4 |
| Sector 2 | Sector 5 |
| Sector 3 | Sector 6 |
| Sector 4 | Sector 1 |
| Sector 5 | Sector 2 |
| Sector 6 | Sector 3 |

One possible implementation for the case of a fixed number of regular sectors 400 ($N_{sectors}$) that may be used for sectoring is exemplified in the following. The respective peer sector k of sector i can be determined as follows:

$$k = \text{mod}\left(i + \frac{N_{sectors}}{2}, N_{sectors}\right),$$

if $N_{sectors}$ is an even number and $i$ is not equal to $N_{sectors}/2$, $$k = N_{sectors},$$

if $N_{sectors}$ is an even number and $i = N_{sectors}/2$.

In case $N_{sectors}$ is an odd number and there is more than one potential peer sector for the considered sector i, e.g. peer sectors k, l:

$$k = \text{mod}\left(i + \left\lceil\frac{N_{sectors}}{2}\right\rceil, N_{sectors}\right), \text{ and } l = \text{mod}\left(i + \left\lfloor\frac{N_{sectors}}{2}\right\rfloor, N_{sectors}\right),$$

if $N_{sectors}$ is an odd number and both $i +$ $$\left\lceil\frac{N_{sectors}}{2}\right\rceil \text{ and } i + \left\lfloor\frac{N_{sectors}}{2}\right\rfloor \text{ are not equal to } N_{sectors}.$$

$$k = N_{sectors}, \text{ and } l = \text{mod}\left(i + \left\lfloor\frac{N_{sectors}}{2}\right\rfloor, N_{sectors}\right),$$

if $N_{sectors}$ is an odd number and $i + \left\lceil\frac{N_{sectors}}{2}\right\rceil = N_{sectors}$, $$k = \text{mod}\left(i + \left\lceil\frac{N_{sectors}}{2}\right\rceil, N_{sectors}\right) \text{ and } l = N_{sectors},$$

if $N_{sectors}$ is an odd number and $i + \left\lfloor\frac{N_{sectors}}{2}\right\rfloor = N_{sectors}$.

A RA scheme based on fixed sectors 400, e.g. a scheme using a static sector-specific mapping table as illustrated by Table 1 can advantageously be performed as follows:

1. Partition the overall number of UEs 301 and/or 302 into a number of equally/unequally sized sectors 400. Here, clustering schemes that require the number of sectors 400 shall be considered for clustering as input in advance (e.g., k-Means) or those schemes that are able to determine the number of suitable sectors 400 themselves (e.g., Neural Gas) may be applied. Further, size constraints may be used to cluster UEs 301 and/or 302 into equally sized clusters. Sectoring can be done based on any of the following factors:
   a. UE density: The number of UEs 301 and/or 302 per sector 400 is kept constant, wherein the number of UEs 301 and/or 302 per sector 400 depends, for instance, on $N_{RB,tot}$ and $N_{cell}$. This clustering may result in unequal sized sectors 400. Here, different UE densities may be considered: e.g. C-UE 302, D-UE 301, or total UE 301 and 302 density.
   b. Fixed Angle: The number of sectors 400 is set to a constant value a priori to the actual sectoring, e.g. 45°, 60°, and 90° (see FIG. 6)
2. Allocate $N_{cell}$ PRBs to cellular users, i.e. C-UEs 302. If the number of C-UEs 302 is larger than the set of available orthogonal radio resources, the assignment of $N_{cell}$ PRBs needs to be done based on, e.g. UE priority and/or QoS requirements.
3. Randomly select ($N_{RB,tot} - N_{cell}$) D-UE pairs 303 and assign ($N_{RB,tot} - N_{cell}$) PRBs to them. Any remaining orthogonal PRBs are assigned to the D-UE pairs 303.
4. Allocate each un-assigned D-UE 303 pair the PRB of a random user (of a C-UE 302 and/or of a D-UE 301) in the respective peer sector of the sector 400, which includes a considered un-assigned D-UE 303 pair. If there is no corresponding user in the peer sector, the considered D-UE pair 303 is not assigned any PRB.

In the following, another possible implementation, which provides an extension to the aforementioned implementation, is outlined. The implementation is applicable in case of uniform and non-uniform user distributions, wherein the following assumption holds:

$N_{cell} < N_{RB,tot} < N_{D2D} + N_{cell} \leq 2 \times N_{RB,tot}$.

Besides, it is assumed that a single PRB is assigned to each link, i.e. to each C-UE 302 or D-UE pair 303. The sectoring based RA procedure then operates as follows:
1. Allocate radio resources (herein PRBs) to cellular users, i.e. C-UEs 302.
2. Cluster D-UE pairs 303 into N sectors 400 with respect to observed D-UE density, e.g. using D-UE pair reference angles. As D-UE pair reference angle, the average or median angle of the Tx and Rx D-UE 301, or either one of these angles, i.e. the angle of the Tx D-UE 301 or the angle of the Rx D-UE 301, respectively, can be used. Further, the number of sectors N for D2D sectoring may be chosen based on various criteria, e.g., system throughput. In addition, the sectoring can be performed based on the D-UE density and/or the C-UE density. For example, as assumed in this implementation, D-UE pairs 303 may be clustered into $N_{RB,Rem}$ sectors 400, where $N_{RB,Rem}$ is the number of remaining orthogonal radio resources, i.e., $N_{RB,Rem} = N_{RB,tot} - N_{cell}$, in order to maximize the number of established D2D links.

3. For each sector 400 select one D-UE pair 303 and assign one PRB to this D2D link.
4. For the D-UEs 301 ($N_{D2D} - N_{RB,Rem}$), which are not allocated in Step 3, perform the following:
   a. If the number of D-UEs 301, which are not allocated so far, is smaller than or equal to the number of assigned D-UEs 301, i.e.

$$(N_{D2D} - N_{RB,Rem}) \leq N_{RB,Rem}$$

then assign un-assigned D-UEs 301 the PRBs of the respective D-UEs 301 located in the peer sectors determined in step 2.
   b. else
      b1: Select an un-assigned D-UE pair 303 from each sector 400, and allocate the PRB of the D-UE 301 located in the peer sector determined in step 2.
      b2: As there are still ($N_{D2D} - 2N_{RB,Rem}$) unassigned D-UEs 301 left, i.e. D-UEs 301 that are not yet assigned any radio resources, identify D2D peer links with respect to C-UE density/locations/angles. For example, clustering of C-UEs 302 into a corresponding number of sectors 400 can be performed, or a peer D2D link of a certain C-UE 302 can be determined by calculating angular differences between D-UE pair reference angles and respective C-UEs 302. Further, path loss estimates of D2D links may be used to ensure maximum separation of a D2D link from a victim receiver, e.g. from a network node, a BS 200, or an eNB. Another PRB allocation method may use a static sector-specific mapping table, as e.g. shown in Table 1 to identify respective peer sectors, wherein sectoring with respect to C-UE locations is required. Another PRB allocation method may use the sectors 400 determined in step 2).
      b3: Assign each un-assigned D-UE pair 303 the corresponding cellular radio resource that is used in the respective peer sector as determined in step b2). The cellular peer sector of a particular D-UE pair 303 is identified, for example, via its sector reference angle 401, its D2D reference angle and/or the C-UE angles, or by a sector-specific mapping table, as shown in Table 1.

Figure 7:
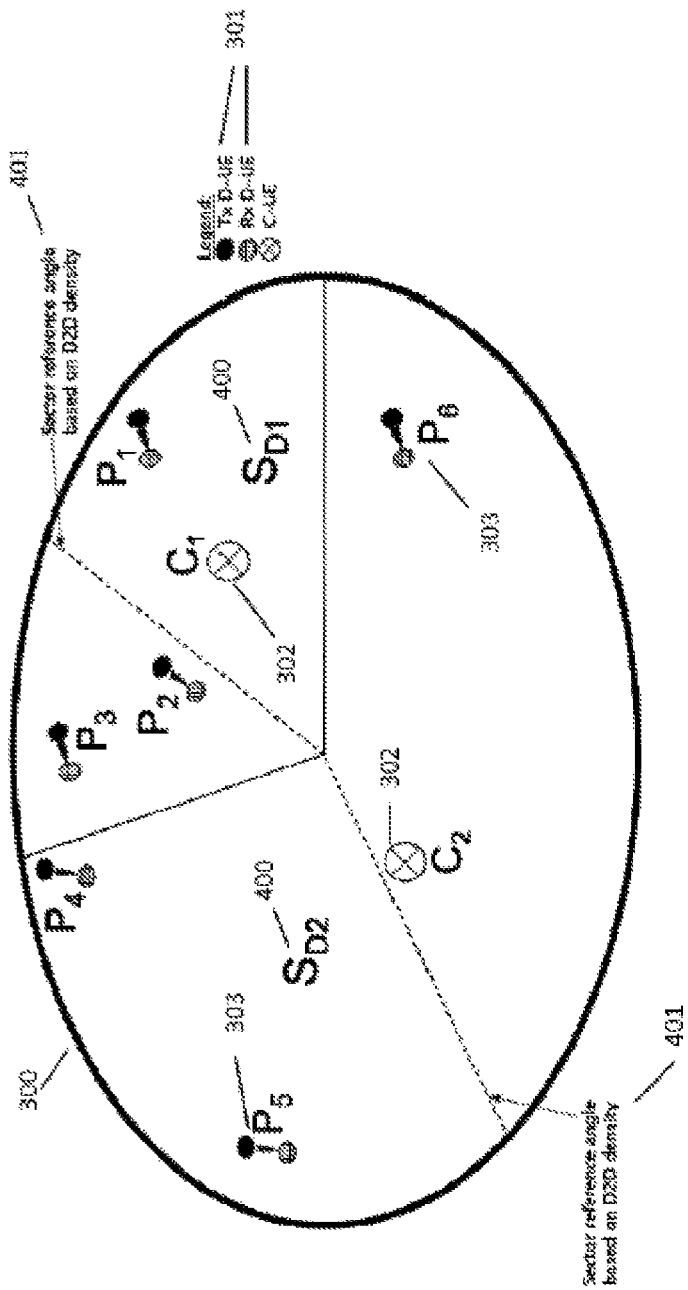
FIG. 7 shows an exemplary sectoring result of an RA scheme according to an embodiment of the present invention.

In FIG. 7, another sectoring result of a cell 300 for an exemplary constellation of two C-UEs 302 labeled with $C_1$ and $C_2$, six D-UE pairs 303 labeled with $P_1$-$P_6$, and $N_{RB,tot}=4$ is depicted. Following the sectoring based RA algorithm as described above, an example of the RA procedure is as follows:
1. Allocate orthogonal radio resources to the C-UEs 302 (in this case $C_1$, $C_2$).
2. Partition the cell 300 into $N_{D2D}$ sectors 400, e.g. sectors $S_{D1}$, $S_{D2}$, $S_{D3}$, $S_{D4}$, $S_{D5}$, $S_{D6}$, or partition the cell 300 into $N_{RB,tot} - N_{cell} = 2$ sectors 400, e.g. as shown here in FIG. 7, i.e. the sectors 400 labeled with $S_{D1}$ and $S_{D2}$.

3. Assign $N_{RB,tot} - N_{cell} = 2$ orthogonal radio resources to the D-UE pairs 303 in $S_{D1}$ and $S_{D2}$, respectively. Here, those D-UE pairs 303 are selected that exhibit minimum angular difference to the D2D sector reference angles 401. Here the sector reference angles 401 of $S_{D1}$ and $S_{D2}$ are respectively based on D2D density, i.e. the average of all D2D angles in a sector, yielding the D-UE pairs $P_2$, $P_5$.
4. Since $(N_{D2D} - (N_{RB,tot} - N_{cell})) = 6 - 2 = 4 > (N_{RB,tot} - N_{cell}) = 2$,
   b1: Determine peer sectors of the sectors 400 labeled with $S_{D1}$ and $S_{D2}$ based on the sectoring result of step 2. Identify ($N_{RB,tot} - N_{cell}$)=2 peer D-UE pairs 303 of those pairs determined in step 3, e.g. $P_2$ and $P_5$, for resource sharing by either randomly selecting peer D-UE pairs 303 or by considering minimum angular differences to those Tx D-UEs 301, to which radio resources have already been assigned, e.g. $P_2$ and $P_5$. For example, the peer selection based on minimum angular differences may result in the following assignments for radio resource reuse: $P_2$ and $P_6$ share radio resources, and $P_5$ and $P_1$ share radio resources.
   b2: As there are still ($N_{D2D} - 2(N_{RB,tot} - N_{cell})) = 6 - 4 = 2$ D-UE pairs 303 left, use C-UE angle information and D-UE reference angles for determining respective D2D peer links.
   b3: Identify cellular peer sectors of unallocated D-UE pairs 303 using angular differences and assign cellular resources to D-UE pairs 303 for reuse, e.g. $C_1$ and $P_4$ share radio resources, and $C_2$ and $P_3$ share radio resources.

The pure angle information based sectoring approaches described above can be extended, e.g. if the granularity or accuracy of the angle information, e.g. obtained by AoA measurements, is not sufficient for a proper sectoring of a cell 300, or if additional information for locating UEs 301 and/or 302 is available. For example, UE-specific ToA information or path loss estimates can be used to determine the distance of a particular UE 301, 302 from the BS 200. If such distance information is available, or can be inferred, sectoring results obtained based on the angle information can be improved, preferably by introducing sector tiles 800 as depicted in FIG. 8.

Figure 8:
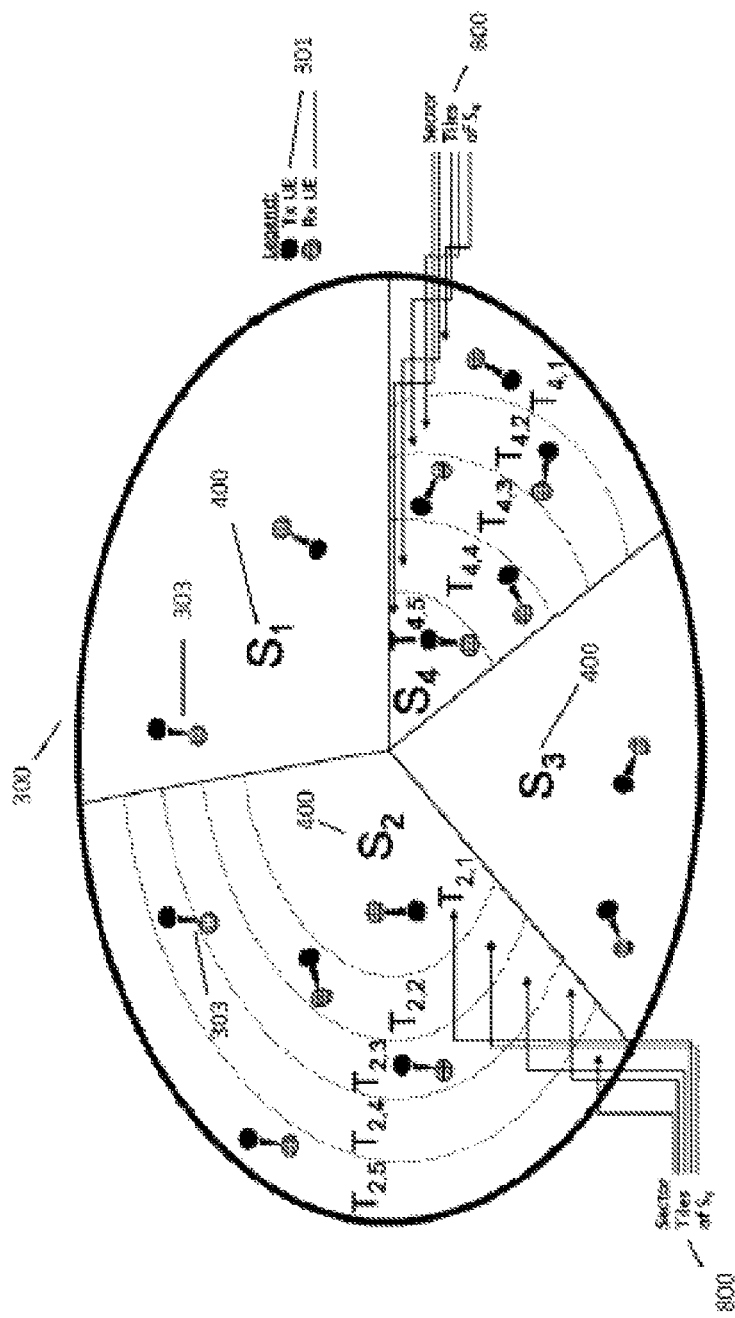
FIG. 8 shows a RA allocation scheme with sectoring and tiling according to an embodiment of the present invention.

FIG. 8 shows a further embodiment of the present invention, which is an extension of the sector-based embodiments shown in the FIGS. 4-7, respectively. In FIG. 8 a cell 300 is divided into four sectors 400 labeled as $S_1$, $S_2$, $S_3$, and $S_4$. In FIG. 8, the sector tiles 800 are marked as $T_{a,b}$, wherein a denotes a sector ID and b denotes a tile ID. Specifically, the sector tiles 800 in FIG. 8 are labeled as $T_{2,1}$, $T_{2,2}$, $T_{2,3}$, $T_{2,4}$, $T_{2,5}$ in sector $S_2$, i.e. are the sector tiles 800 of $S_2$, and $T_{4,1}$, $T_{4,2}$, $T_{4,3}$, $T_{4,4}$, $T_{4,5}$ in sector $S_4$, i.e. are the sector tiles 800 of $S_4$.

Resource allocation is preferably performed per pair of the sector tiles 800. A particular pair of the sector tiles 800 that reuses and shares the same radio resources is identified, for example, by maximal distances between sector tiles 800. For example, the sector tiles $T_{2,1}$ and $T_{4,1}$, $T_{2,2}$ and $T_{4,2}$, etc. share the same radio resources as illustrated in FIG. 8. For determining a distance between two tiles 800, preferably central points can be determined for at least one tile 800. A central point may be determined based on distance information of at least one UE 301, 302 in a tile 800 from a center of the at least one cell 300 of the wireless network. The distance information may, for example, be based on ToA measurements or a path loss estimate. The at least one central point may particularly be determined by the average radial distance of C-UEs 302 and/or D-UEs 301 forming e-g-D-UE pairs 303 in a tile 800, alternatively by the average angular distance of C-UEs 302 and/or D-UEs 301 in the tile 800. Alternatively, a central point may be determined based on a subset of UEs 301 and/or 302 in the tile 800, or alternatively based on an interpolation of coordinates of the corner points of the tile 800. For determining a distance between two tiles 800, alternatively to a central point, another reference of a tile, e.g., corners, and/or edges, can be used.

A further enhancement of the sectoring-based RA schemes described above with respect to the FIGS. 4-8 can be achieved by applying post RA power control on established D-UE pairs 303. Two examples of such schemes based, for instance, upon LTE open loop power control (as described e.g. in 'ETSI TS136.213 "LTE Evolved Universal Terrestrial Radio Access (E-UTRA)—Physical layer procedures", v8.8.0, 2009-10') are described in the following, and can be applied as soon as the radio resource allocation is completed. These advantageous schemes aim at optimizing UE transmit power settings, in order to minimize SINR degradations of neighboring transmission links, e.g. due to co-channel interference.

After the RA has been carried out a D-UE pair 303 will start reusing the radio resources of, for example, one or more C-UEs 302. It is very likely that there will be still some interference at the BS 200 station imposed on the C-UE 302 where radio resources are reused by transmitter D-UEs 301 of D-UE pairs 303. Similarly, for the respective receiver UEs 301 of D-UE pairs 303, C-UEs 302 will pose interference. Thus, there will be degradation of SINR at the receiver D-UE 301 and the BS 200, due to a mutual interference when transmitting on the same radio resources.

In a first transmit power adaptation operation mode, which is envisioned in an embodiment of the present invention, which is an extension of the embodiments shown in FIGS. 4-8, a higher priority is given to the C-UEs 302, and a transmit power adaptation is done, in order to compensate for the interference caused by the D2D transmission and to achieve a cellular target SINR. The degradation of D2D SINR caused at the receiver D-UE 301 of D-UE pairs 303 is thereby not taken into consideration.

For example, in LTE the base station 200, i.e. eNB, controls the UE transmit power settings using parameter $P_0$. $P_0$ represents a cell/UE-specific parameter that is employed to control a SINR target value ($SINR_o$), and is signaled by RRC. The new $P_0$ value of a C-UE 302, due to the first transmit power adaptation mode, may be given as $$P_0 = \alpha(SINR_o + N + I_{D2D}) + (1-\alpha)(P_{max} - 10 \log_{10} M_0)$$

where $I_{D2D}$ denotes the interference caused by the D2D transmission on the same radio resources, and N denotes the noise power. $P_{max}$ denotes the parameter for the maximum transmit power setting. $M_0$ represents the number of radio resources and $\alpha$ denotes a path loss compensation factor.

In a second transmit power adaptation operation mode, which is envisioned in another embodiment of the present invention, a higher priority is given to the D-UEs 301, and a transmit power adaptation is done, in order to compensate for the interference caused by the cellular transmission and to achieve a D2D target SINR. The degradation of cellular SINR caused at the BS 200 is thereby not taken into account. The new $P_0$ value of a D-UE 301 due to transmit power adaptation is given as $$P_0 = \alpha(SINR_o + N + I_{cellular}) + (1-\alpha)(P_{max} - 10 \log_{10} M_0)$$

where $I_{cellular}$ denotes the interference caused by the cellular transmission on the same PRB and N denotes the noise power.

Figure 9:
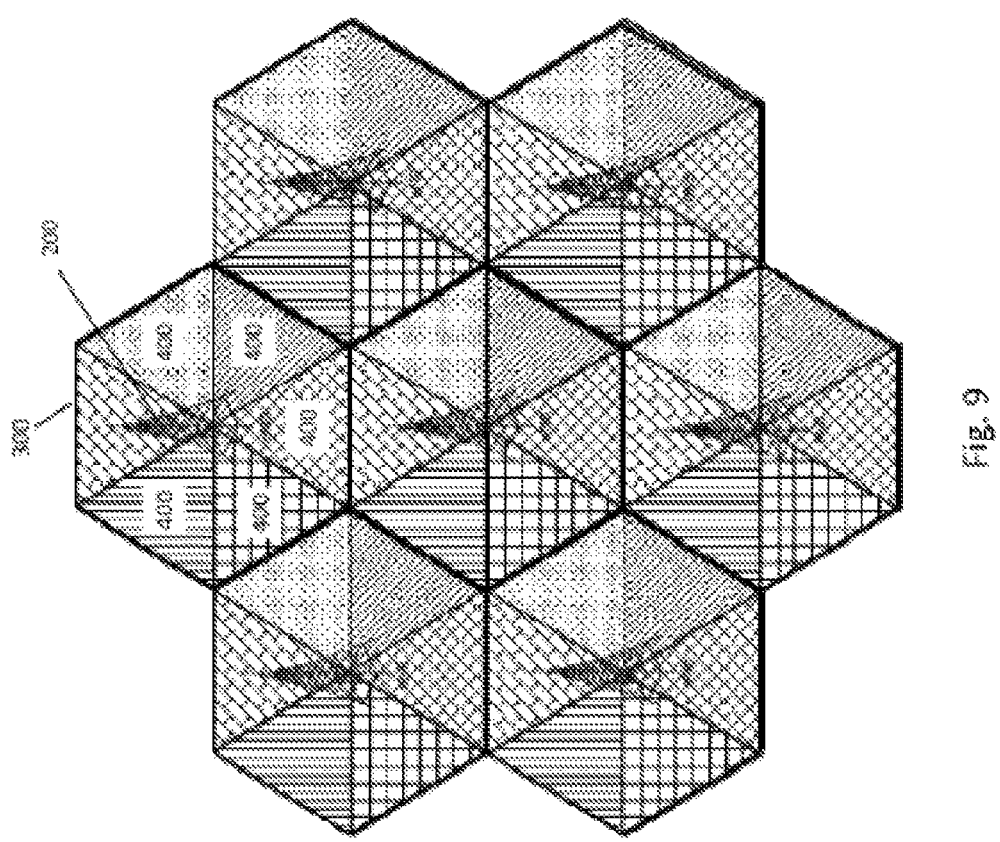
FIG. 9 shows a RA allocation scheme with sectoring in a multi-cell scenario according to an embodiment of the present invention.

The above-described sectoring-based radio resource allocation schemes of the present invention can also be applied in multi-cell scenario embodiments of the present invention, as exemplarily depicted in FIG. 9. In FIG. 9 six virtual sectors 400 indicated by different shadings are considered per cell 300, and seven cells 300 neighboring each other are shown in total, wherein each cell consists of six differently shaded sectors. A BS 200, e.g. an eNBs, is indicated in FIG. 9 in the center of each cell 300 by a cell tower.

In a tri-sector deployment, sectoring with respect to C-UEs 302 can be performed as described above for at least one cell 300. However, for the performance of the sectoring based RA, it can be beneficial to allow further for a fractional frequency reuse between cell sectors 400 and cell sector regions.

Figure 10:
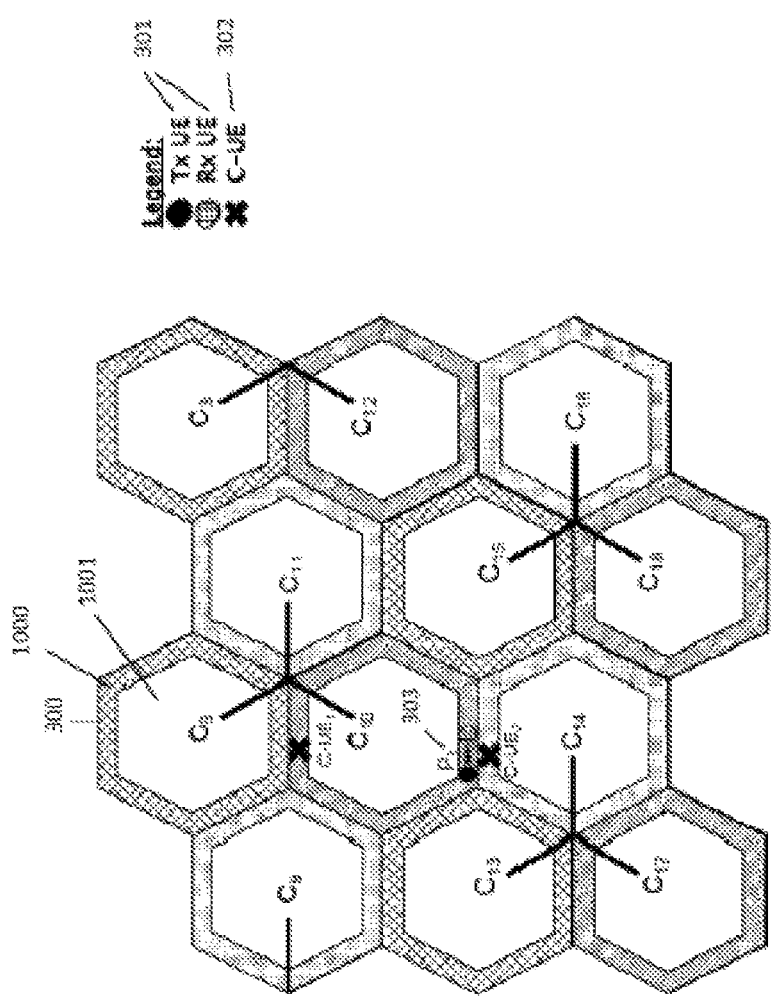
FIG. 10 shows a RA allocation scheme with fractional frequency reuse in a multi-cell scenario according to an embodiment of the present invention.

One exemplary embodiment for such a fractional frequency reuse of C-UEs 302 is illustrated in FIG. 10. FIG. 10 shows an embodiment of the present invention, which is an extension of the embodiment shown in FIG. 9. In FIG. 10 a plurality of cells 300 are marked as $C_a$, wherein "a" denotes the cell ID. Specifically, in FIG. 10 the cells $C_6$ and $C_8$-$C_{18}$ are shown. In this fractional frequency reuse embodiment, separate radio resources or frequencies are assigned to UEs 301, 302 located in center cell regions 1001, wherein the cell center regions 1001 are indicated in white, and UEs 301, 302 located in cell edge regions 1000, wherein the cell edge regions 1000 are indicated in shadings for each cell 300. Different radio resources are assigned to UEs 301, 302 in cell edge regions 1000 of neighboring cells, as indicated by the different shadings of the cell edge regions 1000 of neighboring cells, respectively. For example, the edge region 1000 of cell $C_{10}$ has different shading than the edge regions 1000 of cells $C_9$, $C_6$, $C_{11}$, $C_{15}$, $C_{14}$ and $C_{13}$, respectively, indicating different radio resources. The frequency reuse pattern of UEs 301, 302 in the cell edge regions 1000 may depend, for example, on the respective antenna orientations of a certain cell 300. For example in the cell 300 labeled as $C_{10}$, a D-UE pair $P_1$ 303 is located at the cell-edge 1000, and is assigned the radio resources of a peer C-UE 302, in this case C-$UE_1$. Due to fractional frequency reuse, interference between closely located transmissions, e.g. D2D transmission of $P_1$ in cell $C_{10}$ and cellular transmission of C-$UE_2$ in the cell 300 labeled as $C_{14}$ can be minimized. Hence, employing D2D communication in fractional frequency reuse scenarios allows for increasing resource reuse and for compensating potential spectral efficiency losses, due to static fractional frequency reuse patterns.

Figure 11:
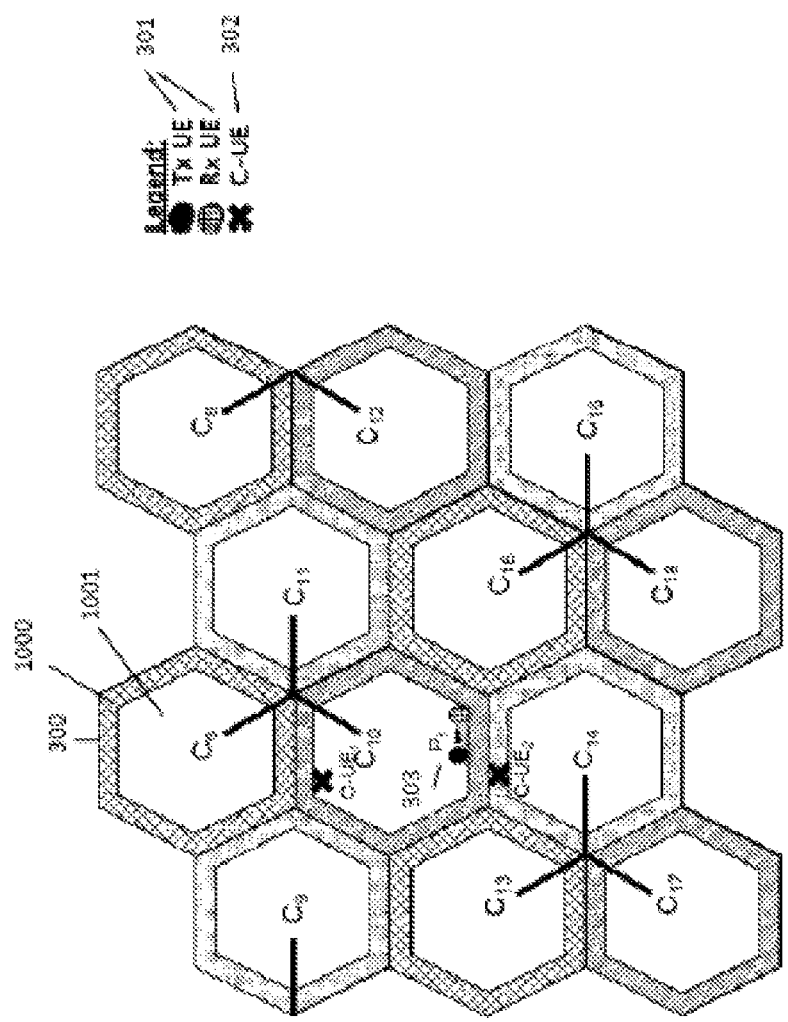
FIG. 11 shows C2D interference for a RA allocation scheme with fractional frequency reuse in a multi-cell scenario according to an embodiment of the present invention.

However, if as shown in FIG. 11, which shows the same cell structure as FIG. 10, the peer C-$UE_1$ and the D-UE pair $P_1$ 303 after the sectoring are located in the cell center 1001 of the cell $C_{10}$, the respective transmissions of C-$UE_2$ and $P_1$ may interfere with each other, since C-$UE_2$, which is located at the cell edge 1000 of the cell $C_{14}$, may employ a high transmission power.

Figure 12:
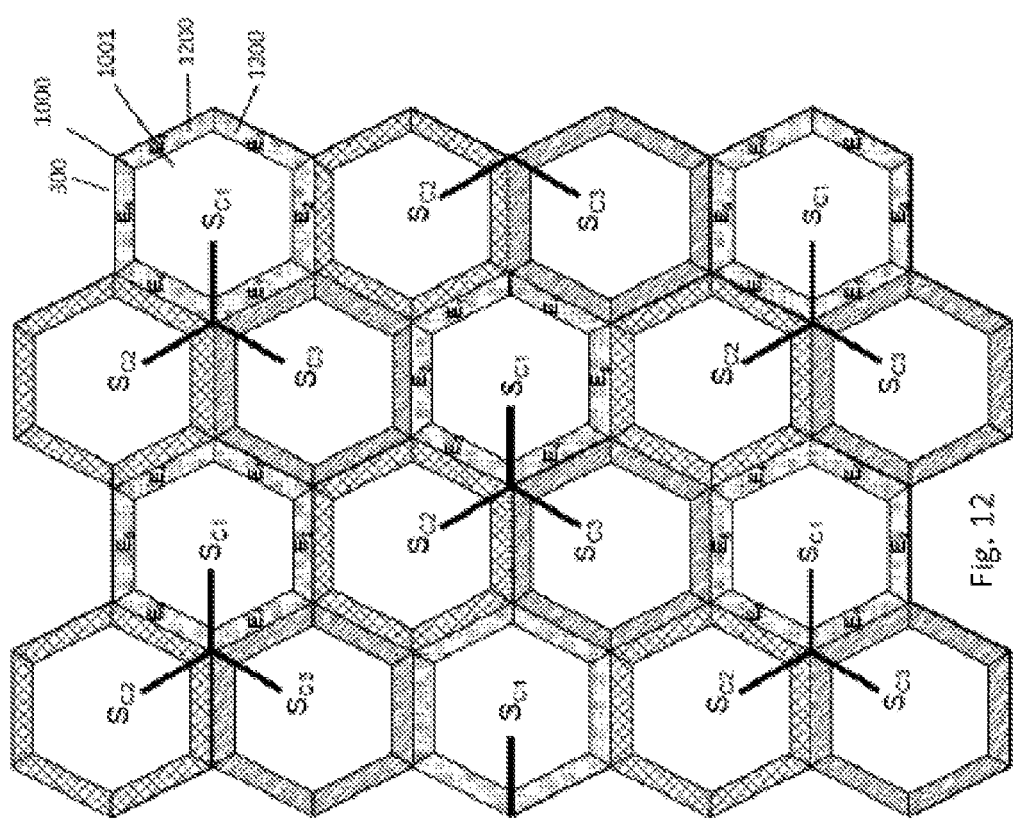
FIG. 12 shows a RA allocation scheme with fractional frequency reuse with alternating cell edge radio resource assignments in a multi-cell scenario according to an embodiment of the present invention.

In order to avoid this C2D interference from the C-$UE_2$ to the D-UE pair $P_1$, cell edge regions 1000 may be further subdivided into cell edge subdivisions 1200 and radio resources may be reused according to the scheme depicted in FIG. 12. FIG. 12 shows an embodiment of the present invention, which extends the embodiment shown in FIGS. 10 and 11.

This approach also requires an exchange of C-UE 302 related selection information about peer UEs, e.g. Sectoring Information (SI), and cell region-specific fractional frequency reuse information among different cell sites 300. Via the exchanged pieces of information, for example, the re-use of resources between cell-center D-UE pairs 303 and cell-edge C-UEs 302 can be avoided. Thus, a situation as illustrated in FIG. 11 can be avoided.

In FIG. 12 a plurality of cells 300 labeled as either $S_{C1}$, $S_{C2}$ or $S_{C3}$ are shown. Each cell has a cell edge region 1000 indicated by shading, and the cell edge regions 1000 of neighboring cells are different, as illustrated by different shadings in FIG. 11. Each cell edge region 1000 may be divided into the cell edge region subdivisions labeled with $E_1$-$E_6$. As specifically illustrated in FIG. 12, the radio resource assignments to the cell edge region subdivisions 1200 used in a cell labeled with $S_{C1}$ (the subdivisions 1200 being labeled as $E_1$, $E_2$, $E_3$, $E_4$, $E_5$, $E_6$) can be inverted at a neighboring cell 300, e.g. cells 300 labeled with $S_{C2}$ or $S_{C3}$ and can only be reused at every second cell 300, i.e. the cells 300 labeled as $S_{C1}$. In FIG. 12, cells 300 are generally labeled as $S_{Ca}$, wherein "a" denotes the cell ID, and the cell edge region subdivisions are generally labeled as "$E_a$", wherein "a" denotes the cell edge region subdivision ID.

In essence, a RA procedure starting at a single cell 300 may be as follows:
1. Allocate radio resources (herein PRBs) to cellular users, i.e. C-UEs 302.
2. Cluster D-UE pairs 303 into N sectors 400 with respect to observed D-UE density, e.g. using D-UE pair reference angle. As D-UE pair reference angle, the average or median angle of the Tx and Rx D-UE 301, or either of these angles, i.e. the Tx D-UE or Rx D-UE angle, respectively, can be used. Further, the number of sectors N for D2D sectoring may be chosen based on various criteria, e.g. system throughput. For example, D2D pairs may be clustered into $N_{RB,Rem}$ sectors 400, where $N_{RB,Rem}$ is the number of remaining orthogonal radio resources, i.e., $N_{RB,Rem}=N_{RB,tot}-N_{cell}$, in order to maximize the number of established D2D links.
3. For each sector 400 select one D2D peer link and assign one PRB to this D2D link.
4. For the D-UEs 301 ($N_{D2D}-N_{RB,Rem}$), which are not allocated in Step 3, perform the following:
   a. If the number of D-UEs 301, which are not allocated so far, is smaller than or equal to the number of assigned D-UEs 301, i.e. ($N_{D2D}-N_{RB,Rem}$)≤$N_{RB,Rem}$, then assign un-allocated D-UEs 301 the PRBs of the respective D-UEs 301 located in the peer sectors determined in step 2
   b. else
      b1: Select an un-allocated D-UE pair 303 from each sector 400 and allocate the PRB of the D-UE 301 located in the peer sector determined in step 2.
      b2: As there are still ($N_{D2D}-2N_{RB,Rem}$) D-UEs 301 left that are not yet provided any radio resources, identify D2D peer links with respect to C-UE density/locations/angles. For example, clustering of C-UEs 302 into a corresponding number of sectors 400 can be performed or a peer D2D link of a certain C-UE 302 can be determined by calculating angular differences between D2D reference angles and the respective C-UE 302. Further, path loss estimates of D2D links may be used to ensure maximum separation of D2D link from victim receiver (e.g. network node, a BS 200, or an eNB). Another PRB allocation method may use a static sector-specific mapping table, as e.g. shown in Table 1, to identify respective peer sectors, where sectoring with respect to C-UE locations is required.
      b3: Assign each un-allocated D-UE 303 pair the corresponding cellular radio resource that is used in the respective peer sector as determined in step b2). The cellular peer sector of a particular D-UE pair 303 is identified, e.g. via its sector reference angle 401, D2D reference angle and C-UE angles, or a sector-specific mapping table, as e.g. stated in Table 1.
5. Perform SI exchange among neighboring network nodes, e.g. BS 200 in neighboring cells 300.

Figure 13:
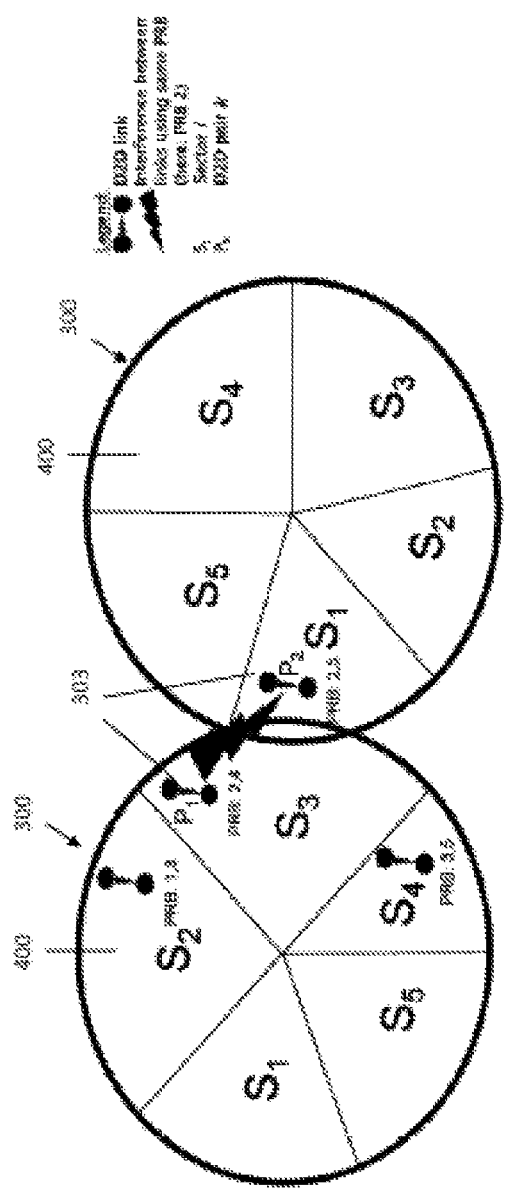
FIG. 13 shows inter-sector interference for a RA allocation scheme in a multi-cell scenario according to an embodiment of the present invention.

In a multi-cell scenario, in which either of the neighboring cells 300 is divided into D2D-related sectors 400, which are not necessarily identical to antenna sectors, and a resource assignment vector is determined, the proposed approach can advantageously be extended to support a multi-cell and mobile D2D scenario by sectoring based fractional frequency/radio resource reuse, as illustrated in FIG. 13.

FIG. 13 shows an embodiment of the present invention, which is an extension of the multi-cell scenarios shown in the FIGS. 9-12. Two neighboring cells 300 are shown, wherein each cell 300 is divided into five sectors 400 labeled as $S_1$-$S_5$. In this embodiment, two D-UE pairs 303 labeled as $P_1$ and $P_2$ (generally D-UE pairs 303 are labeled as $P_k$), which each establish a D2D link, located in neighboring cell sectors 400 labeled as $S_1$ and $S_3$ (generally sectors 400 are labeled $S_i$) of the neighboring cells 300 interfere with each other, since both are using the radio resources PRB 2 at the same time (i.e. interference between links using same PRB), while the radio resources PRB 4 and 5 are orthogonal. Hence, shared usage of identical radio resources (here: PRB 2) in neighboring cell sectors 400 of neighboring cells 300 should be coordinated among neighboring network nodes, e.g. using TDMA.

If sectoring-based RA is individually performed per cell 300, the D-UEs 301 in one cell sector 400 may be still subject to D2D and cellular interference from the adjacent sector 400, due to the usage of a subset of the same radio resources. For example, the D-UE pair 303 labeled as $P_1$ in the cell sector 400 labeled as $S_3$ of the left cell 300 in FIG. 13 uses the radio resources PRB 2 and 4, while the D-UE pair 303 labeled as $P_2$ in the cell sector 400 labeled as $S_1$ of the right cell 300 employs the radio resources PRB 2 and 5 (The D-UE pair in the cell sector 400 labeled as $S_2$ of the left cell 300 in FIG. 13 uses the radio resources PRB 1 and 3, and the D-UE pair in the cell sector 400 labeled as S4 of the left cell 300 employs the radio resources PRB 3 and 5). Hence, these D-UE pairs 303 are affected by inter-D2D interference, if both D-UE pairs 303 use the radio resources PRB 2 in the same time resource, e.g. the same time slots. This situation may occur when there are more D-UEs 301 than the peer C-UEs 302, thereby prompting radio resource allocation from adjacent C-UEs 302, which may be already reserved for other D-UE pairs 303.

In this case, the radio resources reserved for the sectors 400 may be opportunistically scheduled to the transmitting node. For example, in FIG. 13, the D-UE pair $P_1$ is assigned the radio resources PRB 2 in certain time resources, e.g. only in even or odd time slots, and the radio resource PRB 2 is allocated to the D-UE pair $P_2$ in certain other time resources, e.g. only in odd or even time slots. Hence, radio resource allocation can be dynamically varied, if RA and scheduling is coordinated among neighboring cells 300. For this purpose, Sectoring Information (SI) concerning respective cell border regions and related scheduling strategies is preferably coordinated and exchanged between, for instance, BS 200 of neighboring cells 300.

Moreover, due to UE transmit power constraints and/or power control of D2D communications, the effect of inter-D2D interference of adjacently positioned UEs 301 and/or 302 using the same radio resources may be negligible.

Secondly, it is also important to evaluate the overhead associated with such dynamic radio resource assignments between D-UE pairs 303, and to check, whether the amount of D2D interference mitigated justifies the overhead cost. For managing dynamic radio resource allocations, neighboring BS 200, e.g. eNBs, either may coordinate radio resource usage in a time-dependent manner, e.g. based on TTI or frame level, or may issue pre-generated orthogonal radio resource (PRB) hopping sequences, which are valid for a pre-defined amount of time to the respective D-UE pairs 303. In terms of overhead, the first option may require a more frequent exchange of SI and scheduling decisions, e.g. in case of mobile (moving) UEs, whereas the second option results in sharing information, on which hopping sequence is in use and for how long it will be occupied. In the latter case, the hopping sequence length influences the information exchange rate among eNBs.

Figure 14:
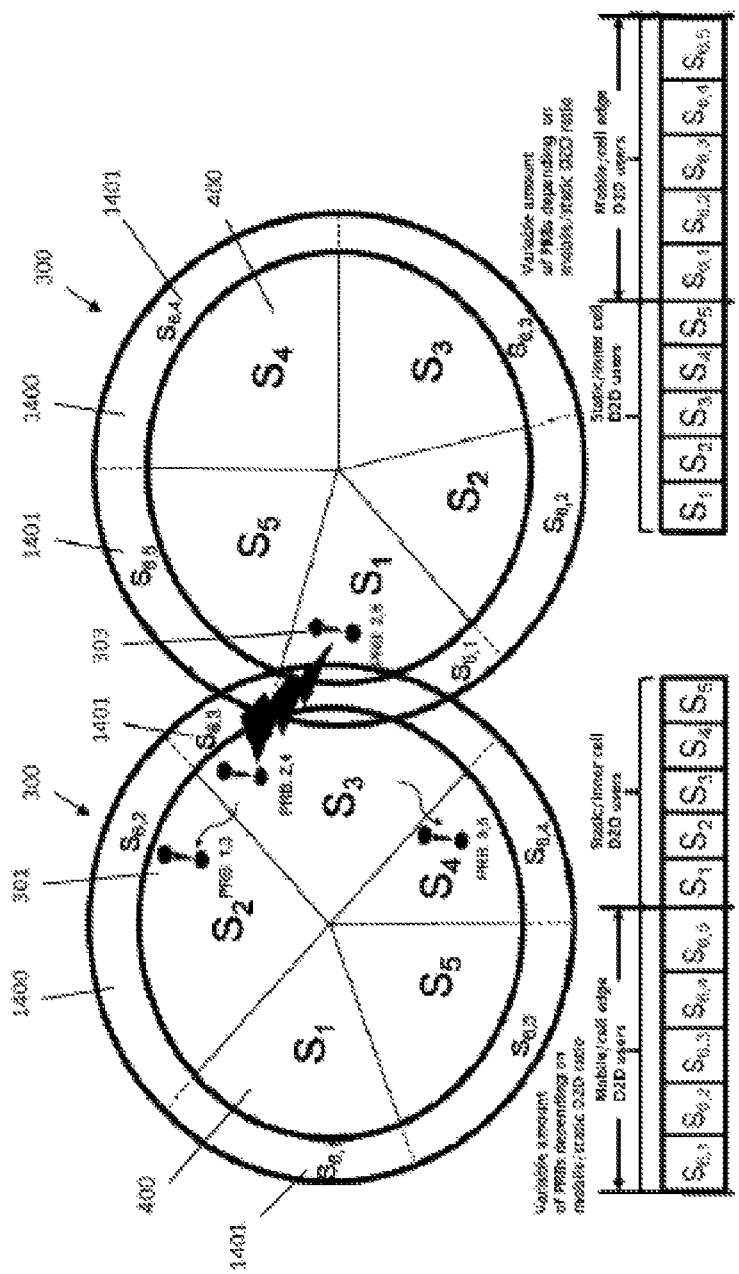
FIG. 14 shows a RA allocation scheme with sectoring in a multi-cell and mobile D2D scenario according to an embodiment of the present invention.

In case the considered scenario comprises mobile D2D users, as depicted in FIG. 14 by curved arrows (moving for instance within a cell 300, but across sectors 400), the proposed sectoring scheme may be extended by:
1. Defining an outer annulus region 1400 as a separate sector 400 for cell edge UEs 301, 302 e.g. based on timing advance and angular direction estimates.
2. Serving mobile D2D users using a variable amount of radio resources depending on observed UE mobility and service demands.

In the embodiment illustrated in FIG. 14, which is an extension of the multi-cell scenario embodiments shown in the previous FIGS. 9-13, sectoring of two neighboring cells 300 results in unequally sized sectors 400 labeled with $S_1$-$S_5$ in each cell 300. In case of D2D operations at cell edges 1400 of the two neighboring cells 300, radio resource usage and re-use should be coordinated among neighboring cell sectors 400. Here, radio resource PRB 2 is, for instance, re-used by D-UE pairs 303 in neighboring cell sectors 400 labeled as $S_1$ and $S_3$ at the same time (i.e. by a D-UE pair 303 in sector $S_3$ of the left cell 300 using radio resources 2 and 4, and a D-UE pair 303 in sector $S_1$ of the right cell 300 using radio resources 2 and 5), while radio resources PRB 4 and 5 are orthogonal, thus giving rise to inter-D2D interference. Given the amount of observed mobile D-UEs 301, the ratio of radio resources available for serving mobile D-UEs 301 may be flexibly varied. For example, a radio resource set $S_6$ may be split into radio resource sub sets 1401 ($S_{6,1}$, $S_{6,2}$, $S_{6,3}$, $S_{6,4}$, $S_{6,5}$) that are exclusively used for mobile and cell edge D-UE pairs 303. The cell edge regions 1400 may be defined based on path loss estimates. The radio resource sets used for sectors 400 labeled as $S_1$, $S_2$, $S_3$, $S_4$, $S_5$ may be employed for serving stationary or inner cell D-UE pairs 303. The size of the respective radio resource sub sets 1401, as depicted at the bottom of FIG. 14, may vary depending on the amount of mobile, cell edge, and stationary D2D users, respectively. In the bottom of FIG. 14 it is specifically shown that, for example, the radio resources in the inner sectors $S_1$-$S_5$ are used for static and/or inner cell D2D users, i.e. D-UE pairs 303, whereas the radio resources in the cell edge regions 1400 divided into the radio resource subsets $S_{6,1}$, $S_{6,2}$, $S_{6,3}$, $S_{6,4}$, $S_{6,5}$ are used for mobile and/or cell edge D2D users. Herein, the variable amount of PRBs depends on mobile/static D2D ratio.

Figure 15:
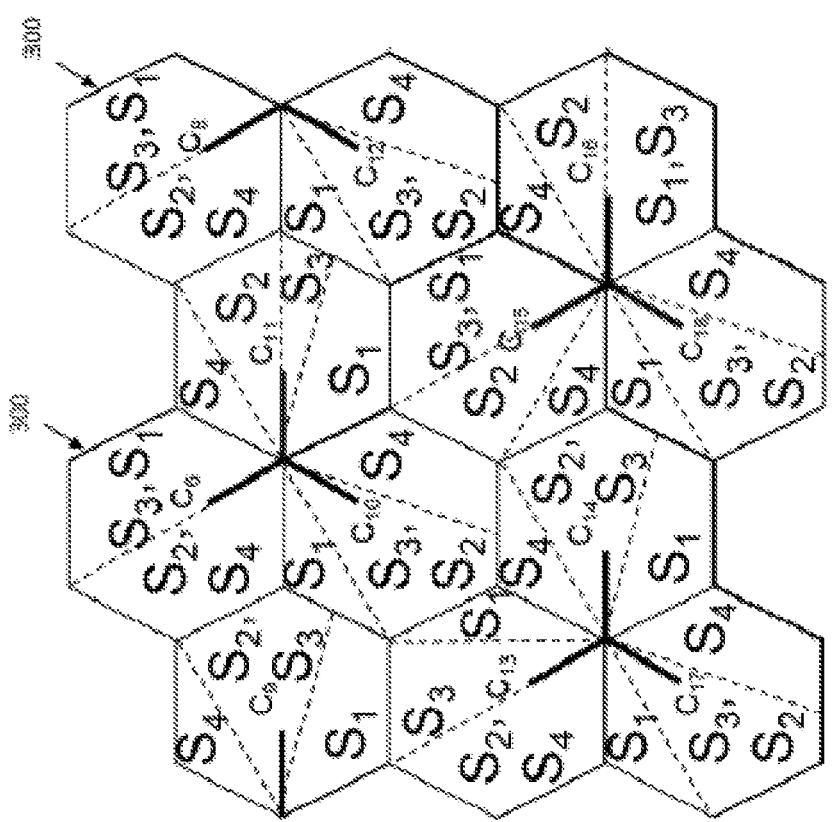
FIG. 15 shows a RA allocation scheme with sectoring with respect to D2D users in a tri-sector multi-cell scenario according to an embodiment of the present invention.

Moreover, the introduced sectoring concept can be transformed to apply to network deployments with tri-sector sites, as exemplarily illustrated in FIG. 15. FIG. 15 shows an embodiment of the present invention, which is an extension of the multi-cell scenario embodiments shown in the previous FIGS. 9-14.

In FIG. 15 a plurality of neighboring cells 300 are shown, which are labeled with $C_6$ and $C_8$-$C_{18}$. In FIG. 15, only D2D-related sectors are depicted. In case sectors with high UE densities are observed, radio resource sets labeled as $S_1$-$S_4$ may be aggregated, in order to handle an increased number of D-UE pairs 303. For example, in the two halves of the cell 300 labeled as $C_6$, radio resource sets $S_1$ and $S_3$ as well as $S_2$ and $S_4$ are combined to balance high D-UE density and corresponding service requests. Similarly, in the horizontal direction of the cell 300 labeled as $C_9$, radio resource sets $S_2$ and $S_3$ are merged for meeting D2D resource demands.

For example, in a tri-sector, multi-cell scenario, as illustrated in FIG. 15, it is assumed that the total amount of PRBs $N_{RB,D2D,tot}$ is partitioned into several radio resource sets, e.g., $S_1$, $S_2$, $S_3$, and $S_4$. These radio resource sets do not necessarily have the same size. Radio resource set assignments are performed per cell 300. The assignment of the radio resource sets to cell sectors 400 depends on, e.g. observed D-UE densities. Sectoring based RA, as described above, may be employed to determine, e.g. D2D and cellular sectors 400 per cell 300. Then, Sectoring Information (SI), including angular-specific radio resource set usage, may be signaled by the BS 200 to neighboring cells 300.

In essence, the sectoring based RA starts at a center BS 200 that communicates its angle-/sector-specific radio resource allocation to its neighboring cells 300. Neighboring BSs 200 can then reuse the same radio resource sets in a distance and angular dependent manner, in order to maximize the reuse distance to the neighboring cell 300 using the same radio resource set. For example, radio resource sets $S_1$ and $S_3$ are reused in the cells 300 labeled as $C_6$, $C_8$, $C_{13}$, and $C_{15}$ with respect to the same angular direction of 120°. Further, radio resource sets may have different sizes. For example, in cell $C_{15}$ the radio resource sets $S_1$ and $S_3$ are combined to meet service/PRB requests in this particular region of cell $C_{15}$. The aforementioned description may be interpreted as a network planning task for D2D communications enabling fractional frequency reuse.

Figure 16:
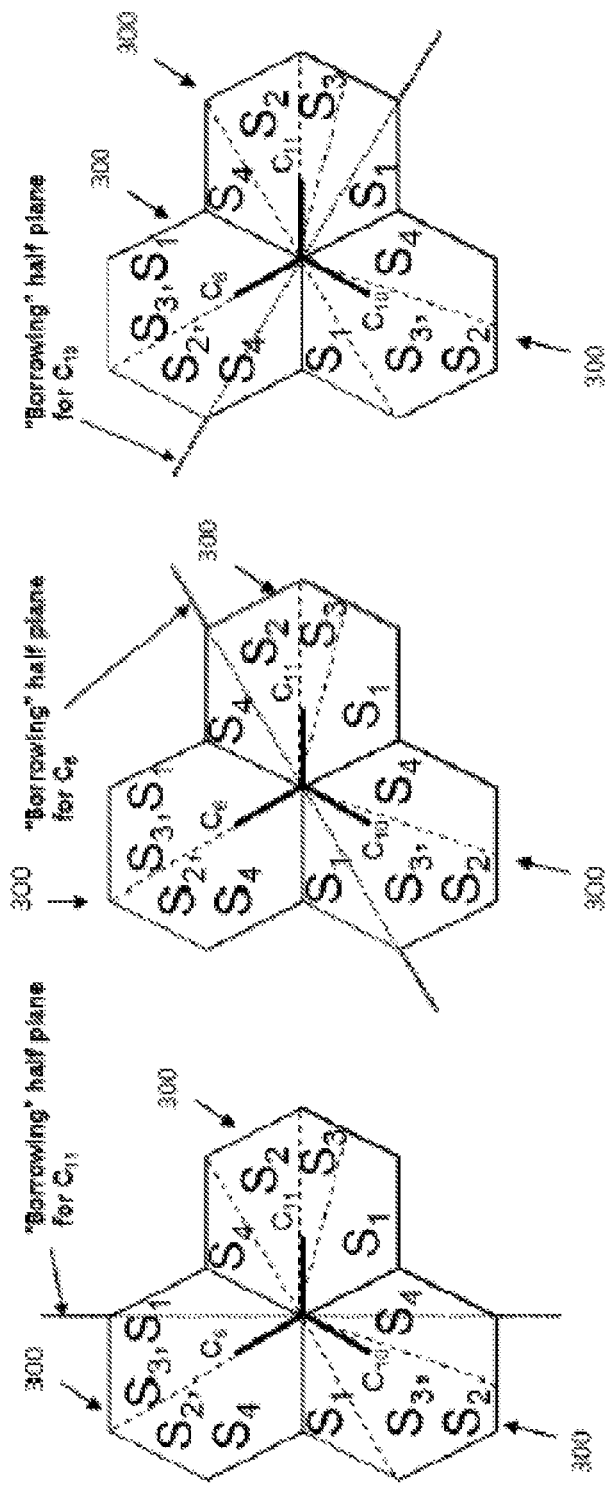
FIG. 16 shows a RA allocation scheme with cell-sector specific borrowing of have planes in a multi-cell scenario according to an embodiment of the present invention.
Figure 17:
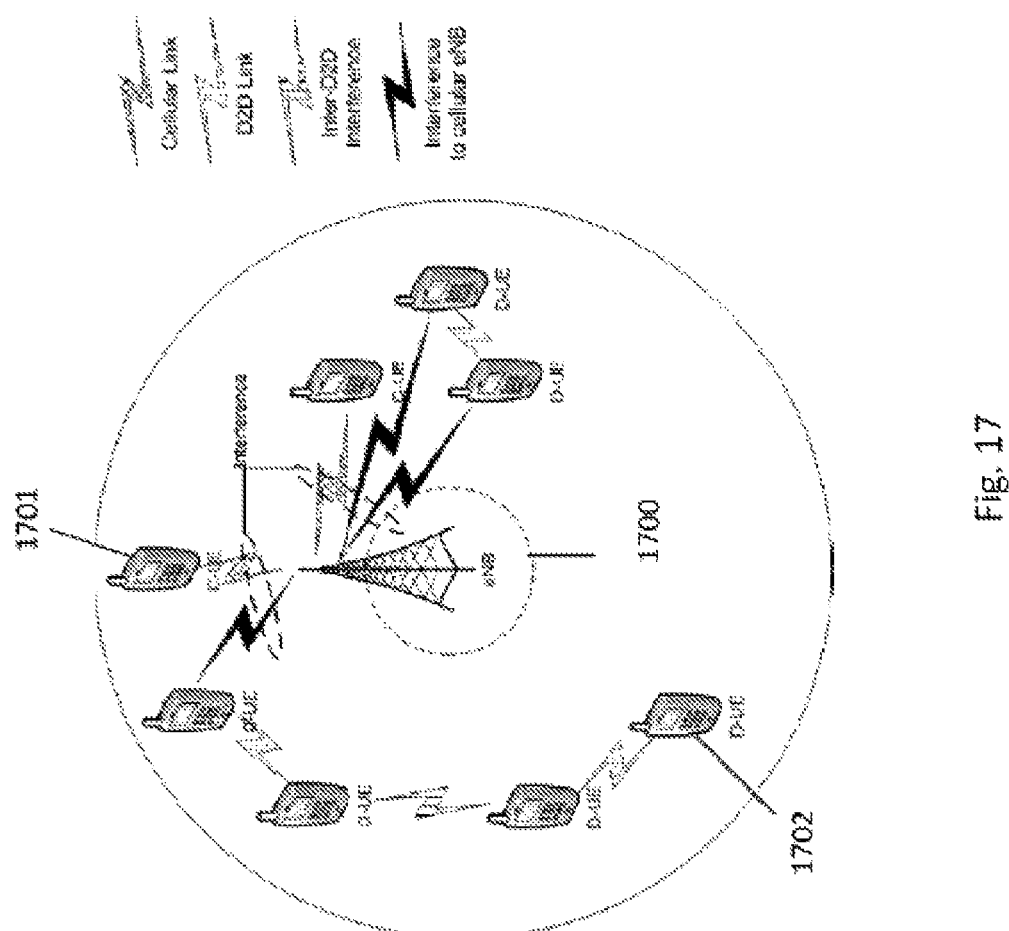
FIG. 17 shows possible interference scenarios in a wireless network of the prior art.

In case of dynamic changes of the UE densities, of D2D mobility, or of cell-specific radio resource requests, cells 300 can borrow radio resources from the neighboring cells 300, as depicted in FIG. 16 for the neighboring cells 300 labeled as $C_6$, $C_{10}$ and $C_{11}$, each provided with radio resource sets $S_1$-$S_4$. FIG. 16 shows an embodiment of the present invention, which is an extension of the multi-cell scenario embodiments shown in the previous FIGS. 9-15

For example, if the radio resources of the cell 300 labeled as $C_{11}$ are not sufficient to meet service requests, the cell 300 labeled as $C_{11}$ can borrow radio resources from its neighboring cells $C_6$ and $C_{10}$, which may allow sharing/re-using radio resources of radio resource sets $S_1$ and $S_4$. The so-called "borrowing" half plane orientation is preferably defined perpendicular to the respective antenna steering direction. For example, "borrowing" half plane orientations of cells $C_6$ (middle scenario, "borrowing half plane for $C_6$"), $C_{10}$ (right scenario, "borrowing half plane for $C_{10}$"), and $C_{11}$ (left scenario, "borrowing half plane for $C_{11}$"), are illustrated in FIG. 16. The decisions about which radio resources to borrow from neighboring cells 300 may be taken independently per cell 300. Further, several borrowing schemes are possible.

For example, cells 300 may select radio resources to borrow in a mutually independent manner, in order to increase probability that neighboring cells 300 facing resource shortage do not choose the same set of radio resources and, thus, increase the radio resource reuse distance. Alternatively, radio resource borrowing information may be exchanged among neighboring BS 200 for coordinating resource allocations. Furthermore, different sectors 400 of a BS or different cells 300 may operate on different frequency bands, e.g. some cells 300 may operate on radio frequencies of 2 GHz spectrum while some other cells 300 may operate on mmW spectrum. Accordingly, borrowing may also imply using part of the neighbor cell's or sector's radio resources.

However, in cases where borrowing radio resources or sets of radio resources from neighboring cells 300 is not sufficient to meet service requests or traffic demands, a group of neighboring BS 200 may collaborate and re-organize/re-sector virtual cell sectors 400 according to locally observed UE densities applying sectoring as described above.

An important characteristic of the present invention is the utilization of angle information for location and interference aware RA of D-UE pairs. If a considered network node, e.g. a BS, is able to perform AoA measurements per D-UE and/or C-UE, angle information per D-UE and/or C-UE can be used for sectoring. The AoA based sectoring method exhibits only little amount of additional signaling among network entities, since it can be performed independently by each network node, e.g. each BS. Other approaches for determining UE angle information with respect to the network node, e.g. the BS, are UTDoA, which requires several network nodes collaborating, or A-GPS, which imposes a significant burden with respect to energy efficiency and computations on the UE side.

In a multi-cell scenario, adjacent network nodes, e.g. BS, are required to exchange the SI in order to coordinate their sectoring and resource allocation strategies. The SI may consist of but not limited to:

1. Sectoring results including the number of sectors, their sector reference angles, associated UEs, UE-specific reference angles (C-UE and D2D reference angles), sector borders, e.g. if sectoring is performed in counter-clockwise direction, the D-UE, C-UE with largest angle in one sector and the D-UE, C-UE with the lowest angle of the next sector are considered for determining the sector border based on, e.g., average or median angle of respective UEs (D-UE, C-UE).
2. Resource Allocation Vectors, e.g., angle-/sector-specific PRB assignments, possibly time dependent, PRB hopping sequence IDs and validity, cell region-specific fractional frequency reuse information among cells.
3. Geo-location information (optional)
4. Target QoS (Reliability, Data rate, etc.)
5. Movement prediction, e.g., for pre-scheduling of PRBs in different sectors of the destination cell.

The SI may be coordinated either centrally or in a distributed fashion. In the centralized scheme a Network Controller (NC), i.e. a central entity, assigns and updates the resource vectors in all of the cells. In a distributed scheme the neighboring cells can be grouped together and are independent with respect to coordination, and control of the SI may result in lesser computational and signaling overhead.

In order to coordinate radio resource allocation based on sectoring among network nodes, information exchange element or elements (IE) can be defined that enclose the above-mentioned pieces of information. IEs can be communicated among neighboring cells, e.g. via LTE over X2 interface in case of a distributed approach. In case of a central entity, similar IEs can be sent to the central entity and central entity communicates the necessary RAs to the relevant BSs. ABS can be an access node controlling, e.g., a macro-cell, pico-cell, micro-cell, relay-cell, or femto-cell.

As indicated previously, transmit power control per radio link can be performed after RA for D2D is complete, in order to further mitigate the impact of underlay D2D communication on cellular network operation. The adaptation of UE transmission powers may account for the presence and establishment of D-UE pairs, and reduces potential performance degradations of cellular links. Similarly, D-UE pairs can exploit their mutual knowledge on D2D link characteristics, in order to adapt transmit powers to reduce potential interference towards cellular networks. In order to facilitate efficient signaling of power control commands, a delta value indicating, e.g. a transmit power increase/decrease (instead of the explicit interference levels in the above-described first and second transmit power operation modes is sent to the UEs depending on, for example, the peer sector configuration. For example, in case D2D communication is prioritized, and/or the peer sector is close (in terms of angular distance and/or radio distance, e.g. based on path loss) issued delta values may be higher to compensate for increased interference among the sectors. In the following, the delta value is described in more detail:

The delta value may be an explicit value or a level indicator, i.e., a quantized value, where different granularities may be used.

The delta value may depend on the angular distance of sectors and/or sector tiles, e.g., in terms of reference angles.

The delta value may depend on the QoS/QoE requirements, received signal power levels, etc.

The delta value may be determined by the BS and communicated to the associated network entities, e.g., D-UEs and C-UEs.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A radio resource management method for Device-to-Device, D2D, communication in a wireless network, comprising:
   determining a first angle information with respect to a base station, based on Angle of Arrival (AoA) or Time Difference of Arrival (TDoA) measurements, for at least one of at least one Cellular User Equipment (C-UE) and at least one D2D User Equipment (D-UE) within at least one cell of the wireless network,
   determining a second angle information with respect to the base station, based on the AoA or the TDoA measurements, for at least one D-UE pair,
   wherein the second angle is one of the following: an average or median angle of a transmitter D-UE of the D-UE pair and a receiver D-UE of the D-UE pair, an angle of the transmitter D-UE of the D-UE pair, or an angle of the receiver D-UE of the D-UE pair, assigning available radio resources to at least one of the at least one C-UE and the at least one D-UE, dividing the at least one cell into a plurality of sectors, wherein at least one of the sectors includes at least one of the C-UE and the D-UE, determining a first reference angle of at least one sector as the average angle information of the first angle information of the at least one UE in the at least one sector, determining a peer sector for the at least one sector, wherein the peer sector is the sector having a second reference angle with the greatest angular difference compared the first reference angle of the at least one sector, selecting, as the at least one peer UE for the at least one D-UE pair, at least one UE located in the peer sector of the sector including the at least one D-UE pair, and sharing at least a part of the radio resources assigned to the at least one peer UE with the at least one D-UE pair.

2. The radio resource management method according to claim 1, comprising:

dividing the at least one cell into a plurality of sectors based on UE density.

3. The radio resource management method according to claim 1, comprising:

dividing the at least one cell into a plurality of sectors of a fixed number.

4. The radio resource management method according to claim 1, comprising:

determining, as the at least one peer UE, at least one UE in the peer sector that has the maximal angular distance from the at least one D-UE pair.

5. The radio resource management method according to claim 1, comprising:

defining an exclusion zone in the at least one cell of the wireless network, and determining, as the at least one peer UE, no D-UE located within the exclusion zone.

6. The radio resource management method according to claim 1, comprising:

measuring distance information from a center of the at least one cell of the wireless network for at least one of the at least one C-UE and the at least one D-UE, dividing at least one of the plurality of sectors into tiles, determining a central point of at least one tile based on the distance information of at least one UE in the at least one tile, determining, as the at least one peer UE, at least one UE located in a tile with a first central point having a determined distance from a second central point of the tile including the at least one D-UE pair.

7. The radio resource management method according to claim 1, comprising at least one of:

adapting a transmit power of the at least one peer UE based on a measured or estimated interference caused by the at least one D-UE pair, and adapting a transmit power of a transmitter D-UE of the at least one D-UE pair based on a measured or estimated interference caused by the at least one peer UE.

8. The radio resource management method according to claim 7, comprising:

transmitting to at least one of the at least one peer UE and the at least one transmitter D-UE, respectively, a delta value indicating a transmit power increase or decrease depending on a constellation between the at least one peer UE and the at least one D-UE pair.

9. The radio resource management method according to claim 1, comprising:

exchanging selection information concerning the selection of the at least one peer UE with at least one other cell of the wireless network.

10. The radio resource management method according to claim 9, comprising:

assigning the available radio resources to the at least one UE separately for UEs located in cell edge regions and UEs located in cell center regions, wherein for UEs located in cell edge regions available radio resources are assigned according to selection information received from at least one neighboring cell of the wireless network.

11. Base station for managing radio resources of Device-to-Device (D2D) communication in a wireless network, comprising:

a determination unit configured to determine a first angle information with respect to the base station, based on Angle of Arrival (AoA) or Time Difference of Arrival (TDoA) measurements, for at least one of at least one Cellular User Equipment (C-UE) and at least one D2D User Equipment (D-UE) within at least one cell of the wireless network, and to determine a second angle information with respect to the base station, based on the AoA or the TDoA measurements, for at least one D-UE pair, wherein the second angle is one of the following: an average or median angle of a transmitter D-UE of the D-UE pair and a receiver D-UE of the D-UE pair, an angle of the transmitter D-UE of the D-UE pair, or an angle of the receiver D-UE of the D-UE pair, a resource allocation unit configured to assign available radio resources to at least one of the at least one C-UE and the at least one D-UE, the determination unit further configured to divide the at least one cell into a plurality of sectors, wherein at least one of the sectors includes at least one of the C-UE and the D-UE, to determine a first reference angle of at least one sector as the average angle information of the first angle information of the at least one UE in the at least one sector, and to determine a peer sector for the at least one sector, wherein the peer sector is the sector having a second reference angle with the greatest angular difference compared to the first reference angle of the at least one sector, a selecting unit configured to select, as the at least one peer UE for the at least one D-UE pair, at least one UE located in the peer sector of the sector including the at least one D-UE pair, wherein the resource allocation unit is configured to share at least a part of the radio resources assigned to the at least one peer UE with the at least one D-UE pair.

* * * * *